(12) United States Patent
Eads et al.

(10) Patent No.: US 12,345,446 B2
(45) Date of Patent: Jul. 1, 2025

(54) INSTRUMENTATION AND METHODS FOR OPTICAL METROLOGY OF HELIOSTATS

(71) Applicant: Arizona Board of Regents on Behalf of the University of Arizona, Tucson, AZ (US)

(72) Inventors: Ryker Eads, Tucson, AZ (US); James Roger P. Angel, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 18/281,217

(22) PCT Filed: Mar. 8, 2022

(86) PCT No.: PCT/US2022/019407
§ 371 (c)(1),
(2) Date: Sep. 8, 2023

(87) PCT Pub. No.: WO2022/192302
PCT Pub. Date: Sep. 15, 2022

(65) Prior Publication Data
US 2024/0159432 A1   May 16, 2024

Related U.S. Application Data

(60) Provisional application No. 63/158,173, filed on Mar. 8, 2021.

(51) Int. Cl.
*F24S 40/90* (2018.01)
*F24S 23/71* (2018.01)
(Continued)

(52) U.S. Cl.
CPC ............. *F24S 40/90* (2018.05); *F24S 23/715* (2018.05); *F24S 50/20* (2018.05); *G01M 11/005* (2013.01);
(Continued)

(58) Field of Classification Search
CPC .......... F24S 40/90; F24S 23/715; F24S 50/20; F24S 2050/25; G01M 11/005
See application file for complete search history.

(56) References Cited

U.S. PATENT DOCUMENTS

| 8,674,280 B1 | 3/2014 | Andraka |
| 2009/0107485 A1 | 4/2009 | Reznik et al. |

(Continued)

FOREIGN PATENT DOCUMENTS

AU   2002244529 B2 * 11/2007 ................. F24J 2/10

OTHER PUBLICATIONS

Gross, "A Journal to Power the Globe with Renewable Energy," (Nov. 18, 2019), (5 pages), https://www.heliogen.com/blog/letter-from-bill-gross/.

(Continued)

*Primary Examiner* — Thanh Luu
(74) *Attorney, Agent, or Firm* — Venable LLP; Henry J. Daley

(57) ABSTRACT

A system for providing a contour map of the surface of a heliostat from reflected sunlight using a fly's eye camera. The system includes an entrance screen configured to receive sunlight reflected by said heliostat; an array of imaging apertures extending across the entrance screen, each aperture forming an image of said heliostat from a different viewpoint to provide a plurality of heliostat images; one or more digital cameras configured to view all of said plurality of heliostat images; an image processor configured to map out from the plurality of heliostat images a location
(Continued)

of sunlight delivered to the entrance screen to obtain a plurality of maps, and to provide, based on centroids of said maps a tip and tilt of each said subsection The reflecting surface profile of the heliostat is obtained by integration of the subsection tilts across all the subsections.

16 Claims, 21 Drawing Sheets

(51) Int. Cl.
    *F24S 50/20*     (2018.01)
    *G01M 11/00*     (2006.01)
    *G01M 11/02*     (2006.01)

(52) U.S. Cl.
    CPC ........ *G01M 11/025* (2013.01); *F24S 2050/25* (2018.05)

(56) References Cited

U.S. PATENT DOCUMENTS

| | | |
|---|---|---|
| 2017/0102446 A1 | 4/2017 | Dealab |
| 2018/0299264 A1 | 10/2018 | Hines |
| 2020/0091863 A1 | 3/2020 | Angel et al. |

OTHER PUBLICATIONS

Barlev et al., "Innovation in concentrated solar power," Sol. Energy Mater. Sol. Cells, (2011), vol. 95, pp. 2703-2725.
AFDC, "Hydrogen Basics," (No. date available).
Solar, "Megalim Solar Power—The Project," (2019), (2 pages).
Lando et al., "An astigmatic corrected target-aligned solar concentrator," Opt. Commun., (Jun. 1, 2000), vol. 180, pp. 127-132.
Xu et al., "Shape and Alignment measurement of the heliostat by laser deflectometry," Proc. of SPIE, (2008), vol. 7046, (10 pages).
N. MKS, "8353 Piezo Actuator, Tiny Picomotor", 12.7 mm Travel, 0.25 in. Shank, (2020), (4 pages).
Shack et al., "The Shack Interferometer.," Spie Clever Optics, (1977), vol. 126, pp. 139-142.
Pirnay et al., "OAJ: 2.6m Wide Field Survey Telescope," in Ground-Based and Airborne Telescopes IV (2012), (14 pages).
Noaa, "Solar Caluclation Deatils", (No. date available), (2 pages), https://www.esrl.noaa.gov/gmd/grad/solcalc/calcdetails.html.
Martin, "Making mirrors for giant telescopes," Proceedings of SPIE, Astronomical Optics: Design, Manufacture, and Test of Space and Ground Systems II, (Sep. 9, 2019), vol. 11116, pp. 4404-4412.
Davidson et al., "Understanding Conjugate Planes and Kohler Illumination," Aperture (2002), (4 pages).
Johns, "The Giant Magellan Telescope (GMT)," in Ground-Based and Airborne Telescopes (2006), (15 pages).
Baig et al., "Non-uniform illumination in concentrating solar cells," Renew. Sustain. Energy Rev., (2012), vol. 16, pp. 5890-5909.
Huang et al., "Review of phase measuring deflectometry," Opt. Lasers Eng., (2018), vol. 107, pp. 247-257.
Trumper et al., "Instantaneous phase shifting deflectometry", Opt. Express, (Nov. 28, 2016), vol. 24, No. 24, (15 pages).
Jiang et al., "Wavefront aberration metrology based on transmitted fringe deflectometry," Appl. Opt., (Sep. 10, 2017), vol. 56, No. 26, pp. 7396-7403.
Huang et al., "Zonal wavefront reconstruction in quadrilateral geometry for phase measuring deflectometry," Appl. Opt., (Jun. 20, 2017), vol. 56, No. 18, (6 pages), pp. 5139-5144.
Su et al., "Software configurable optical test system: a computerized reverse Hartmann test," Appl. Opt. (Aug. 5, 2010), vol. 49, No. 23 (9 pages).
Morales et al., "Geometrical parameters in the Hartmann test of aspherical mirrors," Appl. Opt. (Dec. 15, 1983), vol. 22, No. 24, pp. 3957-3959.
Sasian, "Introduction to Aberrations in Optical Imaging Systems", Cambridge University Press, (2012).
Rakich, "The 100th birthday of the conic constant and Schwarzschild's revolutionary papers in optics," in Novel Optical Systems Design and Optimization VIII, Proceedings of SPIE, (2005). vol. 5875, (8 pages).
Yuan et al., "Aberrations of anamorphic optical systems. I: The first-order foundation and method for deriving the anamorphic primary aberration coefficients," Appl. Opt., (May 1, 2009), vol. 48, No. 13, pp. 2574-2584.
Sands, "Thin double-plane symmetric field lenses," J. Opt. Soc. Am., (Nov. 1973), vol. 63, No. 11, pp. 1391-1392.
Cao et al., "Chromatic aberration of plane-symmetric optical systems," Appl. Opt., (Jan. 10, 2019), vol. 58, No. 2, pp. 227-233.
Tyson, "Conversion of Zernike aberration coefficients to Seidel and higher-order power-series aberration coefficients," Opt. Lett., (Jun. 1982). vol. 7, No. 6, pp. 262-264.
Parkin, "The Breakthrough Starshot system model," Acta Astronaut., (2018), vol. 152, pp. 370-384.
Hyatt et al., "Laser Beam Projection for Starshot Launch," in AO4ELT 2019 - Proceedings 6th Adaptive Optics for Extremely Large Telescopes (2019), (11 pages).
Ai et al., "Effect of piezoelectric transducer nonlinearity on phase shift interferometry," Appl. Opt. (Mar. 15, 1987), vol. 26, No. 6, pp. 1112-1116.
De Groot, "Vibration in phase-shifting interferometry: errata," J. Opt. Soc. Am. A, (Feb. 1995), vol. 12, No. 2, (14 pages).
Brophy, "Effect of intensity error correlation on the computed phase of phase-shifting interferometry," J. Opt. Soc. Am. A, (Apr. 1990), vol. 7, No. 4, pp. 537-541.
Masuko et al., "Achievement of more than 25% conversion efficiency with crystalline silicon heterojunction solar cell," IEEE J. Photovoltaics (Nov. 2014), vol. 4, No. 6, pp. 1433-1435.
Geisz et al., "Six-junction III-V solar cells with 47.1% conversion efficiency under 143 Suns concentration," Nat. Energy, (Apr. 2020), vol. 5, (13 pages).
Saadah et al., "Thermal Management of Concentrated Multi-Junction Solar Cells with Graphene-Enhanced Thermal Interface Materials," Appl. Sci., (2017), vol. 7, No. 589, (13 pages).
Hyatt et al., "CPV generator with dish reflector and fly's eye receiver," in AIP Conference Proceedings, (Sep. 13, 2018), pp. 030008-1 to 030008-1.
Eads et al., "Optical design for a Fly's eye CPV system with large, onaxis dish solar concentrator," in AIP Conference Proceedings, (Aug. 26, 2019), vol. 2149, pp. 050005-1 to 050005-5.
Roberts, "This climate problem is bigger than cars and much harder to solve," Vox, (2019), (25 pages), https://www.vox.com/energy-and-environment/2019/10/10/20904213/climate-change-steel-cement-industrial-heat-hydrogen-ccs.
Igel et al., "Optical analysis of solar facility heliostats," Sol. Energy, (1979), vol. 22, pp. 283-295.
Zaibel et al., "An astigmatic corrected target-aligned heliostat for high concentration," Sol. Energy Mater. Sol. Cells, (1995), vol. 37, pp. 191-202.
Kraemer, "At the solarpaces Conference, Heliogen INTRODUCES solar heat at 1 cent/kWh," (2020).
Roger et al., "Fast Determination of Heliostat Shape and Orientation By Edge Detection and Photogrammetry," in Proceedings of the 14th Biennial CSP SolarPACES Symposium (2008).
Kingslake, "The "Absolute" Hartmann test," Trans. Opt. Soc., (1928), vol. 29, pp. 133-141.
Huang et al., "High-accuracy aspheric x-ray mirror metrology using Software Configurable Optical Test System/deflectometry," Opt. Eng., (2015), vol. 54, No. 8, (11 pages).
Eads et al., "6.5 m telescope for multi-object spectroscopy over a 3? field of view," Appl. Opt., (Aug. 1, 2020), vol. 59, No. 22, (6 pages).
Saunders et al., "Prime focus wide-field corrector designs with lossless atmospheric dispersion correction," Advances in Optical and Mechanical Technologies for Telescopes and Instrumentation, (2014), (10 pages).
Tamai et al., "European Extremely Large Telescope: progress report," Ground-Based and Airborne Telescopes V. (2014), vol. 9145, (9 pages).

(56) References Cited

OTHER PUBLICATIONS

Christou, "Image quality, tip-tilt correction, and shift-and-add infrared imaging," Publ. Astron. Soc. Pacific, (Sep. 1991), vol. 103, pp. 1040-1048.
Yuan et al., "Optical design and evaluation of airborne prism-grating imaging spectrometer," Opt. Express, (Jun. 24, 2019), vol. 27, No. 13, (15 pages).
Eads et al., "A 20 m wide-field diffraction-limited telescope," Philos. Trans. R. Soc. A Math. Phys. Eng. Sci., (2020), vol. 379, 20200141, (15 pages).
Mosby et al., "Properties and characteristics of the Nancy Grace Roman Space Telescope H4RG-10 detectors," J. Astron. Telesc. Instruments, Syst., (Oct-Dec. 2020), vol. 6, No. 4, (37 pages).
Korsch, "Optical design considerations for next-generation space and lunar telescopes", SPIE, Space Astronomical Telescopes and Instruments, (1991), vol. 1494, pp. 111-118.
Hadaway et al., "Lessons learned in the optical design of the Next-Generation Space Telescope," SPIE, Conference on Space Telescopes and Instruments V, (Mar. 1998), vol. 3356, pp. 114-121.
Sasian, "Flat-Field, Anastigmatic, Four-Mirror Optical System For Large Telescopes," Opt. Eng. (Dec. 1987), vol. 26, No. 12, pp. 1197-1199.
Zhao et al., "Comparison of exact pupil astigmatism conditions with Seidel approximations," Appl. Opt. (Dec. 1, 2002), vol. 41, No. 34, pp. 7284-7287.
O'Boy et al., "Vibration of a rectangular plate with a central power-law profiled groove by the Rayleigh-Ritz method," Appl. Acoust., (2016), vol. 104, pp. 24-32.
Senjanovic et al.,"Natural vibrations of thick circular plate based on the modified Mindlin theory," Arch. Mech., (2014), vol. 66, No. 6, pp. 389-409.
Bolcar et al., "The Large UV/Optical/Infrared (LUVOIR) Surveyor: Decadal Mission Concept Design Update," Proc of SPIE, (2017), vol. 10398, (24 pages).
Eads, "Design and Metrology of Optics for Telescopes and Sunlight Concentration", Feb. 15, 2021 (Feb. 15, 2021). [retrieved on Jun. 24, 2022]. Retrieved from the Internet: <URL: https://www.proquest.com/docview/2539877576/fulltextPDF/9AA7C470804847B3PQ/1? accountid=142944> pp. 1-2,47,83,97-124, 129-131.
Johns et al., "Giant Magellan Telescope: Overview," Proc. of SPIE, (2012), vol. 8444, (16 pages).
Meehan, "NREL Developing Improved Tech to Lower Costs for Multi-Junction Solar Cells," Solar Reviews, (2018) (9 pages); https://web.archive.org/web/20201111222740/https://www.solarreviews.com/news/nrel-developing-tech-lower-cost-multi-junction-solar-cells-071918.

\* cited by examiner

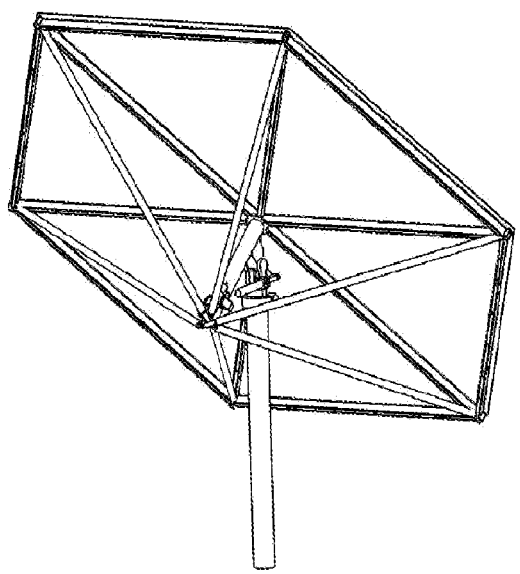
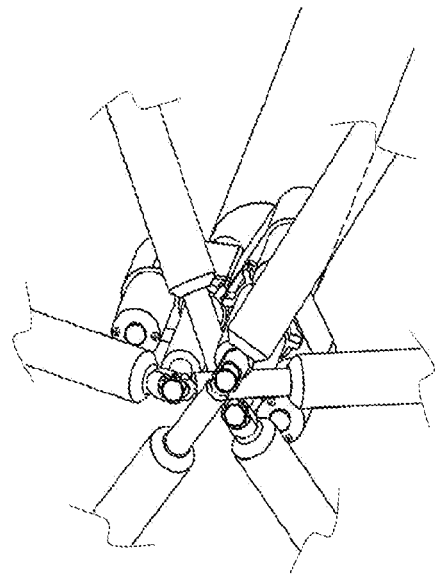
FIG. 9A
FIG. 9B
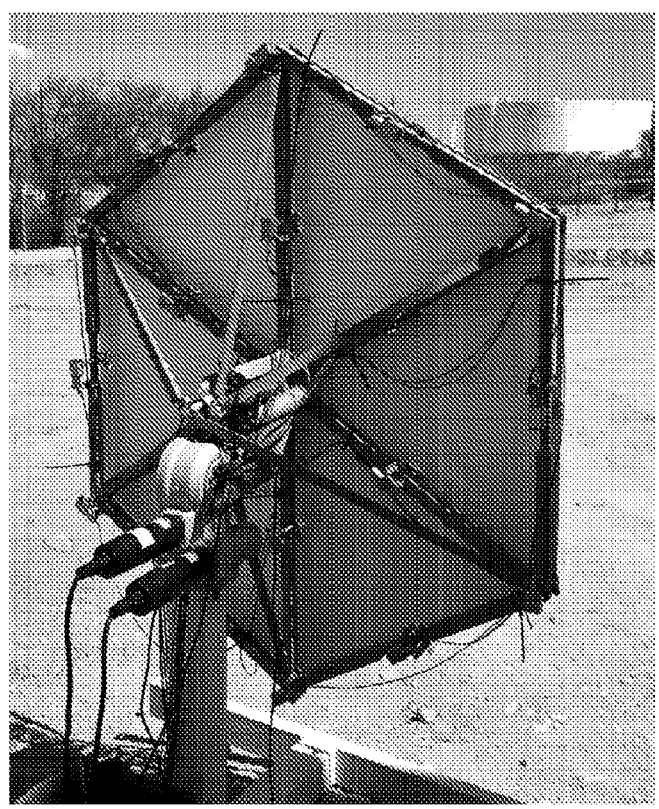
FIG. 10

Figure Error! No text of specified style in document..1:

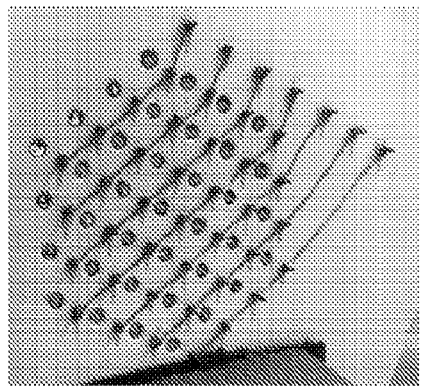 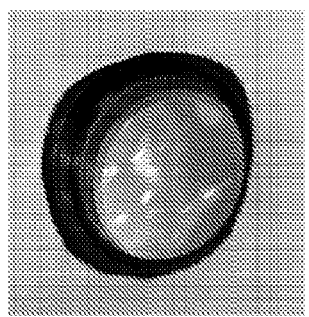 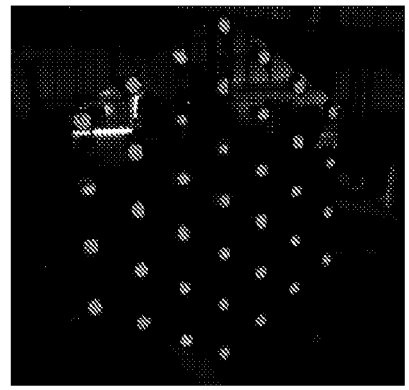
(a)          (b)          (c)
FIG. 21A          FIG. 21B          FIG. 21C
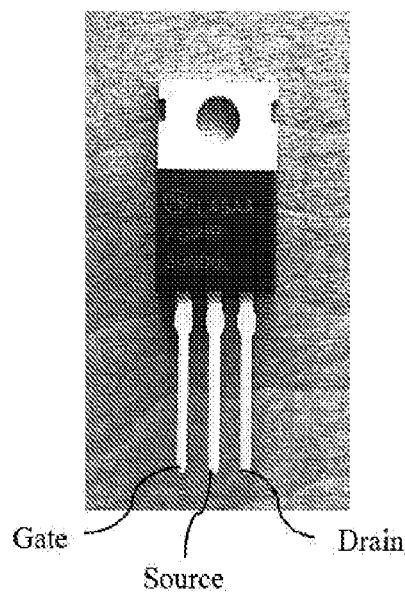
FIG. 22

INSTRUMENTATION AND METHODS FOR OPTICAL METROLOGY OF HELIOSTATS

CROSS REFERENCE TO RELATED APPLICATION

This application is a U.S. National Stage Application of PCT/US2022/019407, filed Mar. 8, 2022, which claims priority benefit to U.S. Provisional Patent Application No. 63/158,173, filed on Mar. 8, 2021, the entire contents of which are incorporated herein by reference.

BACKGROUND

1. Technical Field

Currently claimed embodiments of this invention relate to instrumentation and methods for optical metrology of heliostats.

2. Discussion of Related Art

A field of heliostats is used to harness solar energy, by directing sunlight from locations around a central tower to a receiver atop the tower. In the past, heliostats were of fixed shape, so there was little need for metrology of the shape except in the factory. Field measurements were directed to determining the orientation of the different heliostats, not their shapes, e.g., Heliogen from halo around sun. In some cases, a test screen was provided at the central tower below the receiver, and a photometric camera to study the position and spatial distribution of sunlight reflected to the tower by a heliostat.

But following the current inventors previous PCT application number PCT/US20/53130 filed Sep. 28, 2020 (the entire content of which is incorporated herein by reference in its entirety) for heliostats with actively adjustable shape to improve energy concentration by focusing sunlight on the receiver, directed to a central receiver from sunlight it reflects, there is a need for instrumentation and methods for optical metrology of heliostats.

SUMMARY

According to an embodiment of the present invention, a system for providing a contour map of the surface of a heliostat from reflected sunlight using a fly's eye camera is provided. The system includes an entrance screen configured to receive sunlight reflected by the heliostat; an array of imaging apertures extending across the entrance screen, each aperture forming an image of the heliostat from a different viewpoint to provide a plurality of heliostat images; one or more digital cameras configured to view all of the plurality of heliostat images; an image processor configured to map out from the plurality of heliostat images a location of sunlight delivered to the entrance screen by each of a plurality of different resolved subsections of the heliostat reflecting surface to obtain a plurality of maps, and to provide, based on centroids of the maps a tip and tilt of each the subsection. A reflecting surface profile of the heliostat is obtained by integration of the subsection tilts across all the subsections.

In an embodiment, the heliostat has approximately a torroidal shape used to form a disc image of the sun at the location of the entrance screen, with low order distortion of focus and astigmatism, so that the individual reflector subsections form disc images. In an embodiment, the reflecting surface profile obtained by integration maps indicates the magnitude and sign of the focus and astigmatism distortions.

In an embodiment, the individual reflector subsections form disc images, the disc images not all overlapping.

In an embodiment, the imaging apertures form multiple images of the heliostat reflector on a single imaging screen behind, and all the heliostat images are viewed by a single digital camera.

In an embodiment, the system further includes a plurality of zoom lenses, each zoom lens being disposed at each entrance aperture.

In an embodiment, the system further includes a plurality of heliostats configured to be aimed down one at a time to focus the solar disc to the fly's eye camera, the fly eye camera is configured to rotate about a central receiver tower, and tilts up and down to view all heliostats all around, from the nearest to the farthest.

In an embodiment, the image processor is configured to deliver the heliostat's tip/tilt error as well as its shape error.

Another aspect of the present invention is to provide a method to measure the shape of the surface of a heliostat. The method includes providing a plurality of lasers configured in an array of lasers with a same geometry as a much larger reflective surface of a heliostat; orienting the beams of the plurality of lasers to pass through a zoom lens set to yield an image of the array of lasers magnified to match a size of the heliostat; reflecting the laser beams by the heliostat to a separated distant receiving screen; recording a position of the individual beams on the reflector surface and on the receiving screen using one or a plurality of digital cameras; and calculating a shape of the heliostat reflecting surface based on the known positions of the plurality of lasers and of the position of the plurality of laser beams incident on the heliostat reflecting surface and on the receiving screen.

In an embodiment, the method includes orienting the heliostat to reflect and focus starlight onto the array of a two-dimensional array of digital cameras located at or near the receiver and viewing the heliostat under measurement.

In an embodiment, the method includes computing a slope of the mirror surface using Snell's law for any point on the reflector surface that appears bright in the view from a given camera based on known locations of a star, the reflecting surface point and the camera.

In an embodiment, the method includes performing a complete measurement in a single period of time exposure without moving the heliostat. In an embodiment, the period of time is ~10-second. In an embodiment, the method includes covering all viewing points during the exposure the camera array is translated in a spiral pattern.

In an embodiment, mechanical linkage ensures that the array is not rotated about the line of sight but is tilted slightly so it is aimed always at the heliostat center. In an embodiment, during the exposure the images remain sharp throughout the exposure. In an embodiment, moving the translational spiral so that a time-averaged response function of each camera is conical, with the exposure time to any incoming ray dropping linearly to zero at the lens spacing distance.

BRIEF DESCRIPTION OF THE DRAWINGS

FIGS. 9A and 9B show schematic of deformable shape heliostat mounted on an altazimuth tracker (left) and three pairs of struts are attached to the 6 corners of the heliostat and each pair attached to one of three linear actuators (right), according to an embodiment of the present invention;

FIG. 10 shows a back view of prototype heliostat structure, according to an embodiment of the present invention;

FIG. 21A shows a laser array composed of diode lasers each turned on, according to an embodiment of the present invention;

FIG. 21B shows a laser spots with most of the light passing through the clear aperture of the lens, according to an embodiment of the present invention;

FIG. 21C shows a projected laser spots incident upon the heliostat mirror, according to an embodiment of the present invention;

FIG. 22 shows a FQP30N06L N-type MOSFET, according an embodiment of the present invention;

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

An embodiment of the current invention provides methods to measure the optical shape of heliostats. In one embodiment the measurement is made from sunlight reflected by a heliostat to a central tower, using a fly's eye camera at the tower. In a second embodiment, a plurality of laser beams spread across the heliostat is reflected to a screen. This can provide, for the first time, a practical method to measure the shape of a heliostat from light reflected from across its surface, either sunlight or laser light, for example.

Embodiment 1. Fly's eye camera: This embodiment is a completely novel way to measure the optical shape of a heliostat, from sunlight it reflects to a test screen. In this embodiment, the measurements are made by a metrology camera that views the screen, which is located on the central tower of a heliostat field, below the receiver location. The metrology camera may be used to quickly measure the shape of any heliostat in the field, simply by pointing it toward that heliostat. The camera comprises a first screen with a grid of small aperture lenses holes, each one forming an image of the heliostat on a second screen behind. In this way an array of individual heliostat images are formed on this second screen, one from each lens. Each image has bright regions, from those areas of the heliostat reflecting sunlight to the lens location, and dark regions from those areas that are directing the light elsewhere. A single camera records the full array of images, and from an analysis of the images from all of the lenses, the surface tilt of each location may be derived using a new computer program made for this purpose. By integration of all the tilts across the heliostat surface, a complete contour map of the surface may be derived.

Figure 1A:
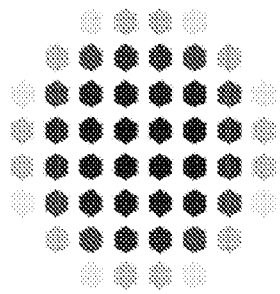
FIG. 1A shows a fly's eye camera image and processed data for error-free surface, according to an embodiment of the present invention.
Figure 1B:
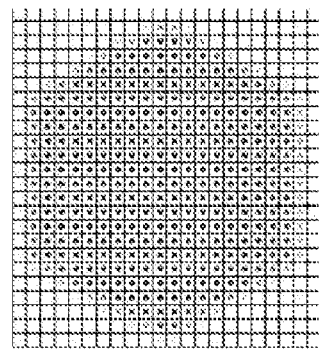
FIG. 1B shows a hexagonal configuration of the fly eye camera, according to an embodiment of the present invention.
Figure 1C:
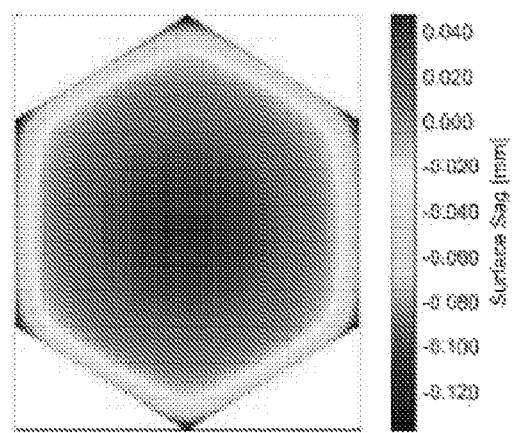
FIG. 1C shows a contour map obtained from the detailed distribution of light in each hexagonal image of the heliostat, shows the image of the solar disc as formed by each of a square grid of sub-apertures across the face of the heliostat, according to an embodiment of the present invention.

FIG. 1A shows a fly's eye camera image and processed data for error-free surface, according to an embodiment of the present invention. FIG. 1A shows the focal plane of the fly's eye camera, where each hexagon is an image of a hexagonal heliostat formed by an individual fly's eye camera lens, according to an embodiment of the present invention. The envelope, an approximately circular distribution of dark and grey hexagons, is a pixelated form of the solar disc image. FIG. 1B shows a hexagonal configuration of the fly eye camera, according to an embodiment of the present invention. FIG. 1C shows a contour map obtained from the detailed distribution of light in each hexagonal image of the heliostat, shows the image of the solar disc as formed by each of a square grid of sub-apertures across the face of the heliostat, according to an embodiment of the present invention. In this case, all the disc images are correctly centered, indicating that the heliostat surface has the ideal shape.

Figure 2A:
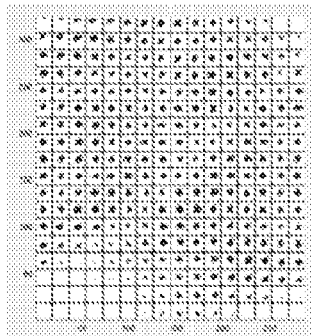
FIGS. 2A-2C are modeled for the case in which the heliostat reflecting surface is not accurate but has slope errors, which result in the solar images formed by each surface sub-aperture being tilted slightly with respect to each other, according to an embodiment of the present invention.
Figure 2B:
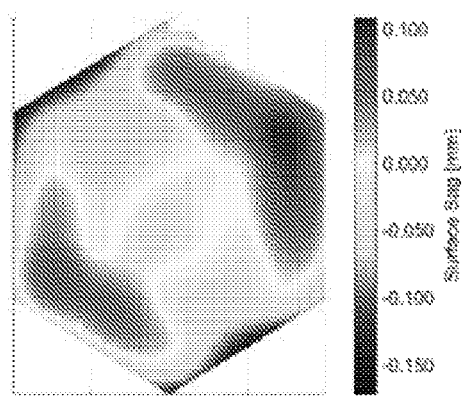
Figure 2C:
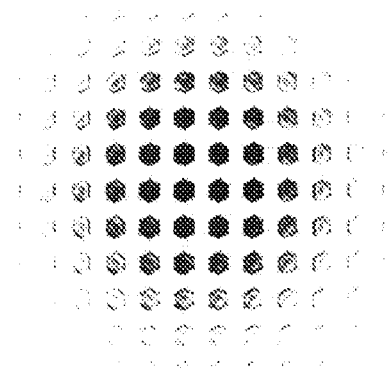

FIGS. 2A-2C are modeled for the case in which the heliostat reflecting surface is not accurate but has slope errors, which result in the solar images formed by each surface sub-aperture being tilted slightly with respect to each other, according to an embodiment of the present invention. FIG. 2A shows a pixelated solar disc image formed by the fly's eye lens elements if somewhat blurred as compared to FIG. 1A, according to an embodiment of the present invention. FIG. 2B shows deconvolved images of the solar disc displaced away from the central, zero-tilt positions, providing a measure of the slope tilt error at each point across the hexagonal reflector surface, according to an embodiment of the present invention. FIG. 2C shows the desired contour map of the reflector surface obtained by integrating these slopes across the surface, according to an embodiment of the present invention. The maps obtained by an embodiment of the invention in this way may be used to calibrate the shape actuation control system within each heliostat, to ensure operation at peak performance both at initial set up and over decades of operation of the heliostat field. A feature of the invention is that measurements and data reduction take only a few seconds, so that each of a field of thousands of heliostats may be measured once each day, and over several days in all the different orientations of the heliostat that require different shapes. It is of particular value that the measurements of shape are made with the heliostat in exactly the operational orientation, with exactly the gravitational bending for that orientation.

Figure 3:
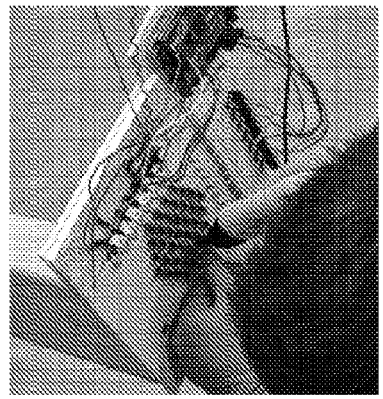
FIG. 3 shows a system measure the shape of the surface of a heliostat, a plurality of small lasers is configured in an array with the same geometry but on a much smaller scale than the large reflective surface of a heliostat, according to an embodiment of the present invention.

Embodiment 2: FIG. 3 shows a system measure the shape of the surface of a heliostat, a plurality of small lasers is configured in an array with the same geometry but on a much smaller scale than the large reflective surface of a heliostat, according to an embodiment of the present invention. The beams of the lasers are oriented so that they all pass through a zoom lens, whose magnification is set to yield an image of the laser array magnified to match the size of the heliostat. The zoom lens is thus set for constant magnification, independent of the distance to the heliostat.

Figure 4:
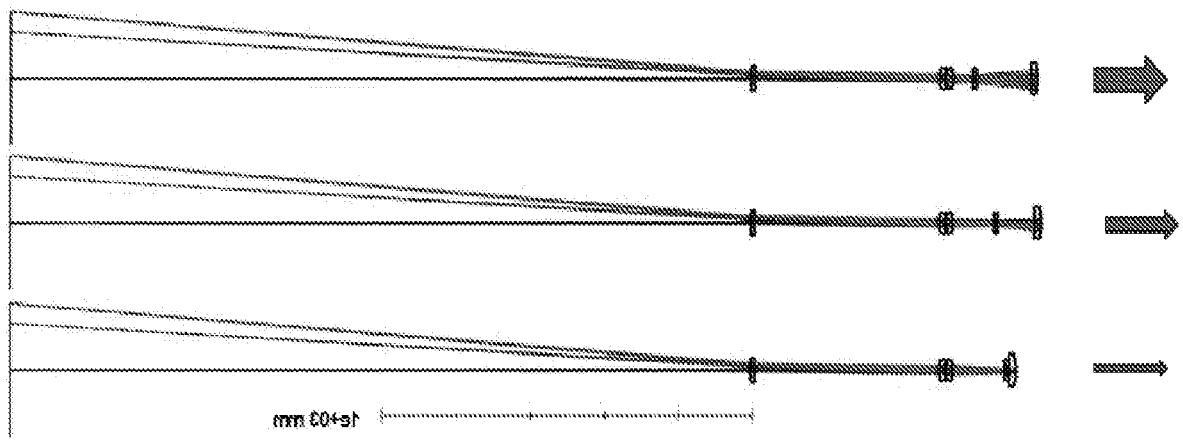
FIG. 4 shows a lens projects a magnified image of the laser array (left) to heliostats at different distances, far (top) medium (middle) and near (bottom), according to an embodiment of the present invention.

FIG. 4 shows a lens projects a magnified image of the laser array (left) to heliostats at different distances, far (top) medium (middle) and near (bottom), according to an embodiment of the present invention. The laser beams are reflected by the heliostat back to a separated distant receiving screen, where the position of the individual beams is recorded by one or a plurality of digital cameras. The position of the beams on the reflector surface, scattered by dust on the surface, is also recorded by a second camera and on the receiving screen.

Figure 5:
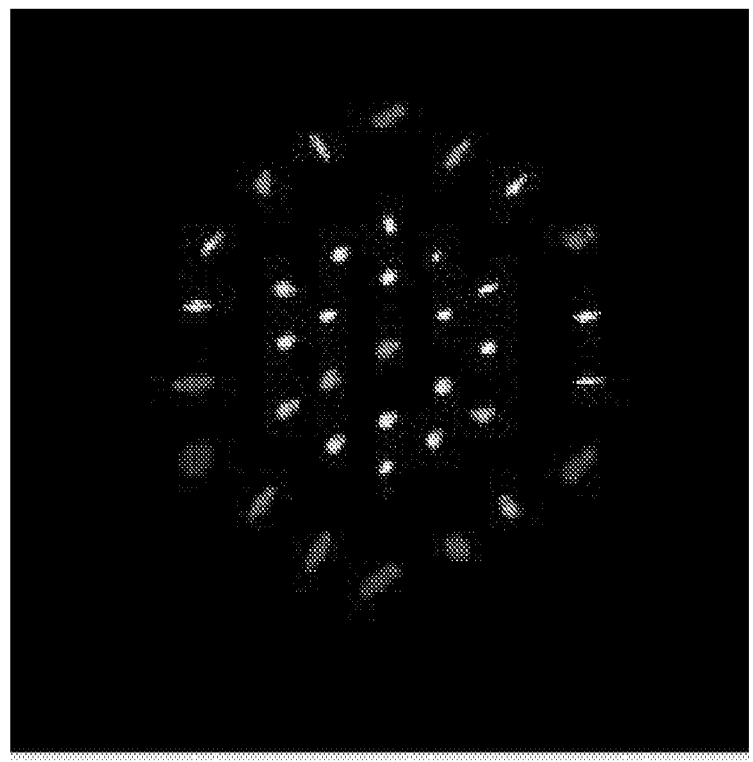
FIG. 5 shows an example of laser beams on a receiving surface after reflection by a hexagonal heliostat, according to an embodiment of the present invention.
Figure 6:
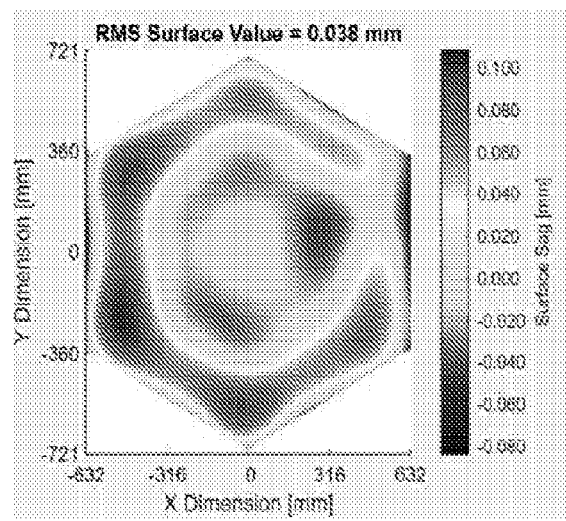
FIG. 6 shows a contour map of the RMS surface sag, according to an embodiment of the present invention.

FIG. 5 shows an example of laser beams on a receiving surface after reflection by a hexagonal heliostat, according to an embodiment of the present invention. From the known positions of the source lasers and of the position of the laser beams incident on the heliostat reflecting surface and on the receiving screen, a computer program calculates the shape the heliostat reflecting surface. FIG. 6 shows a contour map of the RMS surface sag, according to an embodiment of the present invention.

Rapid In-situ Metrology of a Heliostat using Starlight in a Single Exposure: Here we describe how bright stars may be used to make a full calibration of heliostat shape at any elevation and azimuthal setting, without disruption of normal daytime operation of the heliostat field. The method is particularly valuable for measuring heliostats whose reflector shape may be actively altered to form sharp images of the solar disc throughout the day. Such a heliostat has been recently demonstrated', using just three linear actuators to correct the optical aberrations caused by changing angles of incidence, and gravitational bending in different orientations.

Our metrology method involves use of a two-dimensional array of digital cameras, located at or near the receiver and viewing the heliostat under measurement, which is oriented to reflect and focus starlight onto the array. For any point on the reflector surface that appears bright in the view from a given camera, the slope of the mirror surface may be computed using Snell's law, given the known locations of the star, the reflecting surface point and the camera. But because the camera lenses in any practical system form a sparse array, starlight from much of the reflector surface will fall between the lenses. It has been proposed 2 that a series of different images be obtained with the heliostat turned to a slightly different orientation between each one, but accuracy is then limited by pointing errors, and the measurement is extended to allow for settling after each repositioning.

In our method according to an embodiment, a complete measurement is made in a single ~10-second time exposure without moving the heliostat. During the exposure the camera array is translated in a spiral pattern, covering all viewing points. A mechanical linkage ensures that the array is not rotated about the line of sight but is tilted slightly so it is aimed always at the heliostat center. The images thus remain sharp throughout the long exposure. The translational spiral motion is arranged so that the time-averaged response function of each camera is conical, with the exposure time to any incoming ray dropping linearly to zero at the lens spacing distance.

We have modeled the performance of such a system. After the single exposure, the $i^{th}$ camera image records brightness $L(x_i, y_i, x_j, y_j)$ where $(x_i, y_i)$ is the position of the $i^{th}$ camera in the camera array coordinate system, and $(x_j, y_j)$ is the position of the j th pupil segment in the coordinate system of the heliostat. In our method, the slope of the segment is calculated by $$\frac{\partial Z_{err}}{\partial x}(x_j, y_j) = \frac{\sum_i x_i L(x_i, y_i, x_j, y_j)}{2F \sum_i L(x_i, y_i, x_j, y_j)} \quad (1)$$

$$\frac{\partial Z_{err}}{\partial y}(x_j, y_j) = \frac{\sum_i y_i L(x_i, y_i, x_j, y_j)}{2F \sum_i L(x_i, y_i, x_j, y_j)}$$

The slopes are relative to the ideal heliostat reflector surface forming a focused point image of the star at the center of the lens array. This actual surface shape relative to the ideal shape is obtained by integration of these slopes across the reflector surface. The pointing error is given by the overall tilt of this surface, and the shape after tilt subtraction gives the residual shape error.

The accuracy of the method was evaluated by computer modeling for the case of a 6 m heliostat at a distance F=200m, imaged by an array of 50 mm aperture cameras in an equilateral triangular array with 0.25 m spacing. Curvature and astigmatism test errors were imposed on the heliostat surface, long exposure images simulated, and the surface errors reconstructed as described above. The method recovered the surface shapes to better than 0.05 mrad RMS accuracy (i.e., ~1% measurement accuracy of the required toroidal curvatures).

Modelling also shows that slope and shape errors may be recovered by eqn. 1 for the case of sunlight or moonlight (in any phase) reflected to the camera array. The same high accuracy is achieved in a single short exposure, provided the array is large enough to receive all the light and the lens spacing is a small fraction of the solar disc.

In the following paragraphs, the results of a real experiment show that the desired heliostat shape changes for actively focusing are possible on an altazimuth mounted heliostat. This was accomplished by mounting the mirror on a stiffening truss structure. Truss members could be lengthened or shortened in pairs by three linear actuators to bend the mirror into the desired shapes. Of course, this was not done without first knowing the shape of the mirror. Therefore, a non-null metrology system was designed and implemented for measuring the shape of the mirror for a variety of situations where the sag was changed by several millimeters. This metrology system has the potential to be used in situ (i.e., from a power tower). Additionally, a complementary in situ null metrology system is introduced.

Now that we have seen that an actively controlled shape heliostat is desirable for high solar concentration, a metrology technique for measuring that shape change is necessary. Existing methods for heliostat metrology have been concerned with measuring canting of flat mirror segments. Typical heliostats consist of many flat segments that are tilted in an overall concave shape. Though, shape change due to gravitational deflection is also of great concern. If there is concern about heliostat mirror shapes, this is generally measured in the factory by deflectometry or a laser array. Canting a heliostat involves tipping and tilting the different facets (generally flat in shape) across the structure of a heliostat so that they form overlapping solar images (ideal canting).

Photogrammetry is a common technique for measuring the canting of a heliostat. Images of the heliostat are taken from a variety of orientations and by correlating the images the tilt of the facets relative to each other can be determined. This technique has reasonable accuracy (<1 mrad) and can even be used to measure gravity sag deflection. However, photogrammetry requires the camera to be relatively close to the heliostat being measured, and thus can be a lengthy process for a large field of heliostats. In contrast, edge detection techniques can obtain heliostat pointing and surface errors in a fraction of the time, though measurement uncertainties are often >>1 mrad.

Figure 7:
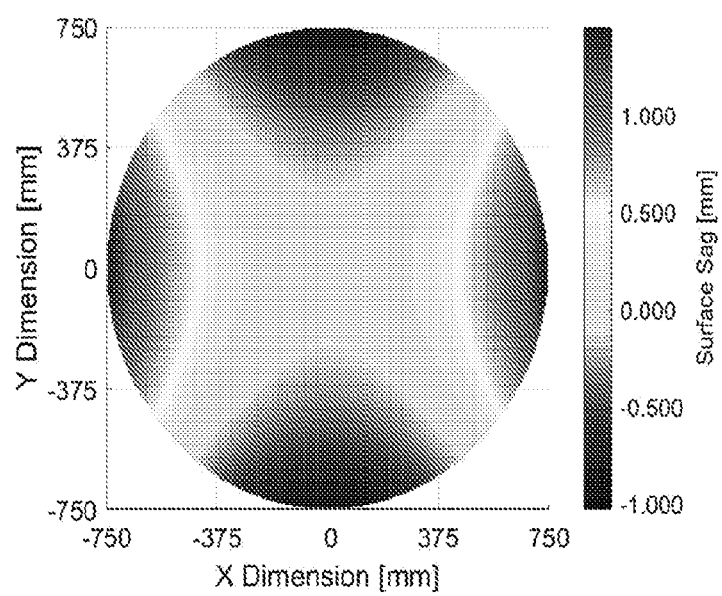
FIG. 7 shows an effective shape error of the heliostat, according to an embodiment of the present invention.

Faster and more accurate measuring techniques are still an area of research for heliostat fields. A minimum absolute accuracy of 0.2 mrad is desirable. This number is somewhat arbitrarily provided. Taking a measurement with this accuracy, the ideal heliostat shape error of 1 mrad RMS is attainable. The shape error provided by heliostat manufacturers is generally defined for flat facets or curved facets in different manners. In the case of flat facets, 1 mrad shape error is associated with the pointing of the facets and the deviation from flatness of each facet. Similarly, curved facet users are concerned with deviation from the desired curvature and pointing errors. These errors together are ideally less than 1 mrad RMS. If these shape errors were defined relative to the ideal shape as defined in section 3.5, the surface errors are much greater. For example, a focusing heliostat that is reflecting light at 45° angle of incidence will have significant blurring of the solar image due to astigmatism. FIG. 7 shows an effective shape error of the heliostat, according to an embodiment of the present invention. Assuming the spherical shape is perfect, and the pointing is perfect, the minimum RMS slope error for such a heliostat is 2.4 mrad, and the error budget is already used up.

An altazimuth mounted heliostat with adjustable shape was introduced. A project funded by Tech Launch Arizona led to the manufacture this heliostat along with a unique low-cost metrology system. In combination, the adjustable shape heliostat and metrology system were used to bend a flat piece of glass to the ideal toroidal shape with <1 mrad RMS absolute surface slope error, meaning the surface error relative to the ideal toroidal surface.

Adjustable Shape Heliostat on an Altazimuth Tracker: Three coefficients are required to define the ideal toroidal surface of a heliostat. Therefore, an adjustable shape heliostat must be able to change its shape in at least three ways. Additionally, the ideal heliostat shape is composed of functions which each have symmetry. Curvature is axially symmetric, oblique astigmatism is double-plane symmetric about a 45° axis and 135° axis, and vertical astigmatism is double-plane symmetric about the local x and y axes. Thus, it is possible to perform shape adjustment in three pairs, where the shape adjustment mechanism of each pair exhibits single-plane symmetry.

To preserve symmetry, each of the shape adjustment modes should be equally separated. In this manner, the ideal mechanism for shape adjustment is for a hexagon shaped heliostat where shape adjustment occurs at each of the 6 corners. The 6 corners are divided into 3 pairs, each with corners at 180° orientation, each pair adjusted with the same sag change. The performance of such a design was verified using ANSYS.

What is attainable from a heliostat mirror supplier is piece of flat back silvered glass. The average toroidal shape was bent into such a glass mirror by adjustment of 19 pad actuators, separate from the bending mode actuators. The bending mode actuators were used to bend the shape throughout the day relative to the preloaded shape.

Figure 8:
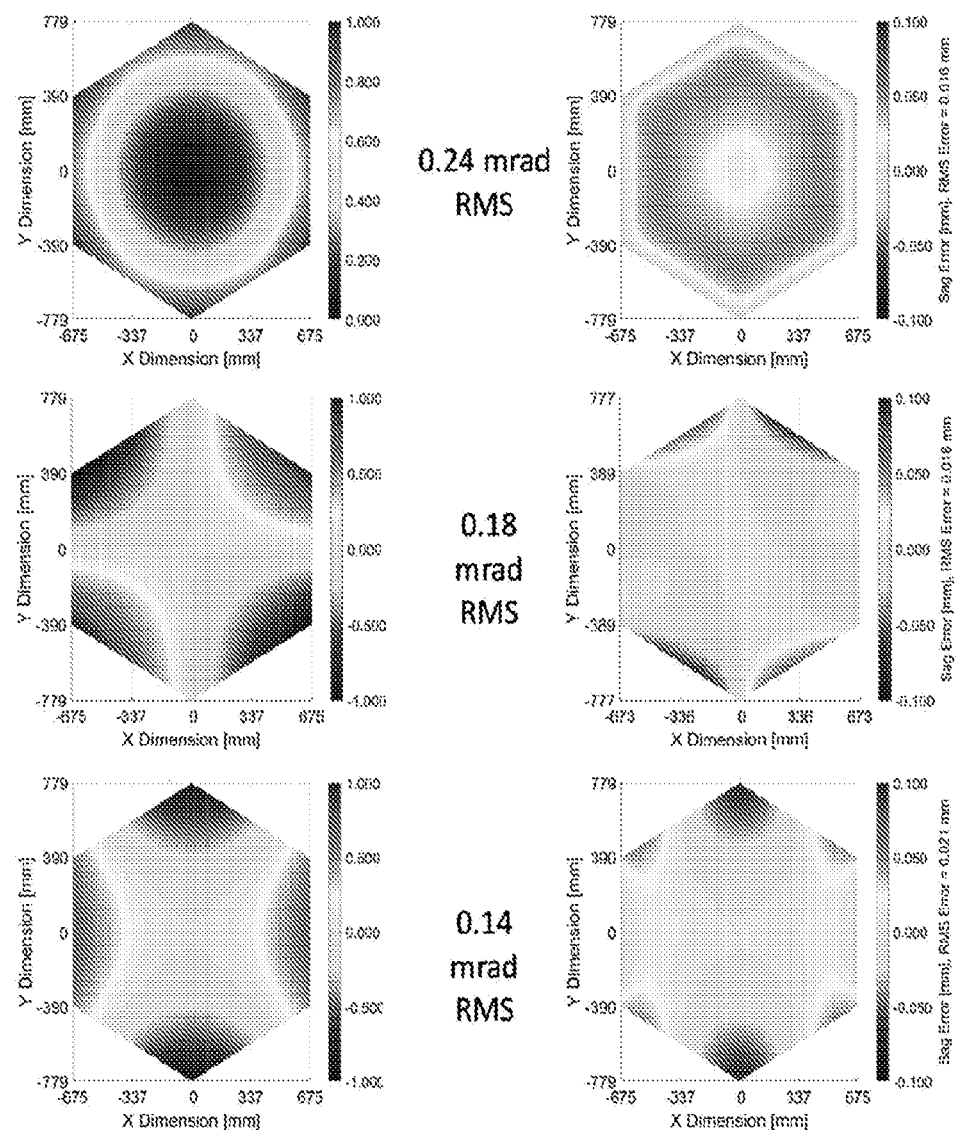
FIG. 8 shows a sag plot of each of the modes along with the sag errors for each mode, according to an embodiment of the present invention.

An FEA model in ANSYS was created by Nick Didato where a flat piece of 3 mm thick glass was mounted on the 19 pads attached to a frame. Force was exerted on the 6 corners of the mounting frame such that the shape of the glass was bent towards each of the three required modes in turn. The maximum sag for each mode was set to 1 mm. The sag data for each type of bending was exported and further processed in MATLAB. FIG. 8 shows a sag plot of each of the modes along with the sag errors for each mode, according to an embodiment of the present invention. The RMS slope error in each case is close to 0.2 mrad RMS, well within 1 mrad RMS slope error. FIG. 8 represents an ANSYS model of bending modes of a 3 mm hexagon shaped piece of glass mounted on 19 pads each attached to a hexagon shaped frame. Forces were exerted on the 6 corners of the frame in pairs. Each of the 6 corners needed to be adjusted in concert to obtain each of the desired bending modes independently. For the case of 1 mm maximum sag the RMS slope errors are close to 0.2 mrad for each of the bending modes. The left column is the net shape change, and the right column is the error in net shape change from the pure mode. The top row is for curvature ($X^2+Y^2$), middle row for oblique astigmatism ($2XY$), and bottom row for vertical astigmatism ($X^2-Y^2$).

The forces are exerted on the 6 corners of the frame by attaching a variable length strut to each corner with the other end of each strut attached to a back-center node. This back-center node consists of three linear actuators where each pair of 180° oriented struts attaches to one of the actuators, thus providing the means for changing the length of two struts in concert. In this manner a truss structure is formed. This structure is dual purpose. First, it allows the frame to be bent in the three independent modes, and second it stiffens the frame so that gravitational deflection is minimized (FIGS. 9A and 9B). FIGS. 9A and 9B show schematic of deformable shape heliostat mounted on an altazimuth tracker (left) and three pairs of struts are attached to the 6 corners of the heliostat and each pair attached to one of three linear actuators (right), according to an embodiment of the present invention. In this manner the 6 corners can be deflected by adjustment of the linear actuators, thus allowing curvature, oblique astigmatism, and vertical astigmatism to be induced into the surface independently.

As previously mentioned, the glass is mounted onto the frame with 19 pads, 18 of which were used to set the average toroidal shape. This is desirable for two reasons: the RMS slope error is less when the shape of the mirror is adjusted by the 18 pads, and the total shape change possible is greater when the initial shape of the mirror is near a median surface shape. This second reason is because the linear actuators have a maximum force that they can exert. The maximum sag surface could not be achieved if the 3 linear actuators had to force the surface into the right shape beginning with a flat mirror. Therefore, a median surface shape was set by the mounting pads, and active adjustment of the mirror was accomplished with the 3 linear actuators, where the full range of desired surfaces was within the force limitations of the linear actuators.

FIG. 10 shows a back view of prototype heliostat structure, according to an embodiment of the present invention. The altazimuth tracking mechanism is visible along with the 18 adjustable pads and the 3 linear actuators, each attached to a pair of struts. The 6 struts are clearly visible along with the 3 linear actuators. The series of wires shown each go to motors attached to the 18 pads that were used for adjusting the initial shape of the mirror. This was chosen to increase the speed and accuracy of the initial shape adjustment but would not be required for a commercial version of this heliostat.

This prototype heliostat should be viewed as a proof of concept. Many aspects of this design may make it too expensive for commercial heliostats, such as the slewing bearing dual-axis tracking mechanism, or the requirement to manually adjust the initial shape of the heliostat with an array of motors. With additional research into a commercial application of this heliostat the potential for a low-cost heliostat is there. For example, the use of a truss structure to stiffen the frame requires less steel than the traditional fish-bone structure. Cost is also less for the mirror since there is no need to make a curved surface via thermal slumping or grinding and polishing. Only a flat mirror is required, which is bent into the appropriate shape.

Having the heliostat structural requirements well defined led to the requirements for the metrology system. First, the heliostat shape change requirements were on the order of many millimeters. An interferometric null test was thus impractical, considering the shape errors that were inherently part of the mirror because of the type of structure used for mounting and bending the flat mirror into shape. A deflectometry non-null system could have been used for measuring the mirror shape, but this would have required a large distance from the mirror to keep the measurement near the center of curvature, or possibly a very large display used at a closer distance. The accuracy of a deflectometry measurement would have been very good, perhaps too good. Such a metrology system may have been like purchasing an airplane to fly from your house to the grocery store. What this heliostat needed was something far less accurate, only 0.2 mrad!

Figure 11:
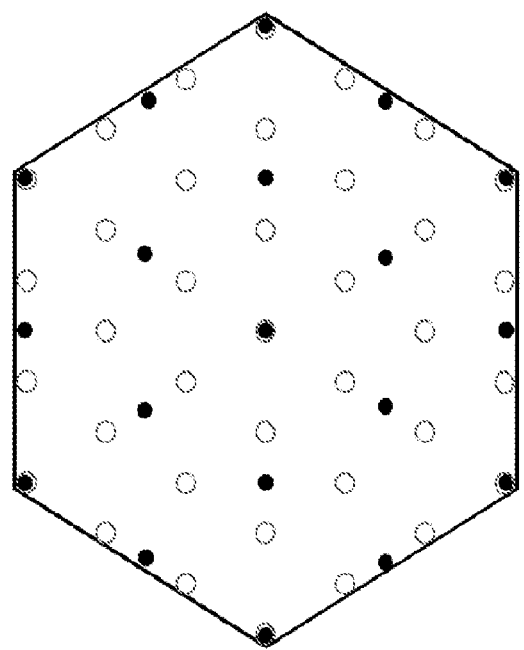
FIG. 11 shows a minimum number of sampling points required to determine sag shape. The mounting pads are shown as black filled circles and the sampling points are shown as red outline circles, according to an embodiment of the present invention.

Defining the surface information needed for a successful prototype is helpful for determining the type of measurement. First, the beginning surface is a piece of flat glass. This heliostat used glass provided by Rioglass Solar with <1.0 mrad RMS flatness. The additional surface errors caused by bending the glass could then only occur at the pads and between pads because the beginning surface was continuous. To properly sample the spatial changes of the surface, the frequency of the measurement needs to be higher than the frequency of the pads. The hexagon with three pads on a side then needs to be measured by at least four lasers on a side, thus requiring 37 lasers (see FIG. 11). FIG. 11 shows a minimum number of sampling points required to determine sag shape. The mounting pads are shown as black filled circles and the sampling points are shown as red outline circles, according to an embodiment of the present invention. This sampling is determined by the ways the shape can be adjusted. The sampling needs to be at least twice the frequency of the pads.

In order to fit the approximately cubic curves formed along three pads, the surface needs to be sampled at a minimum of the pad frequency. However, this is similar to sampling at the Nyquist frequency of an optical system, therefore a higher sampling frequency is ideal. At much higher spatial frequencies more surface information is gained, though the ability to correct for such higher spatial frequency errors is not possible using the adjustable pads alone. Therefore, for the purposes of this experiment, only 37 sampling points were required. Thus, the idea of a laser Hartmann measurement was implemented.

Figure 12:
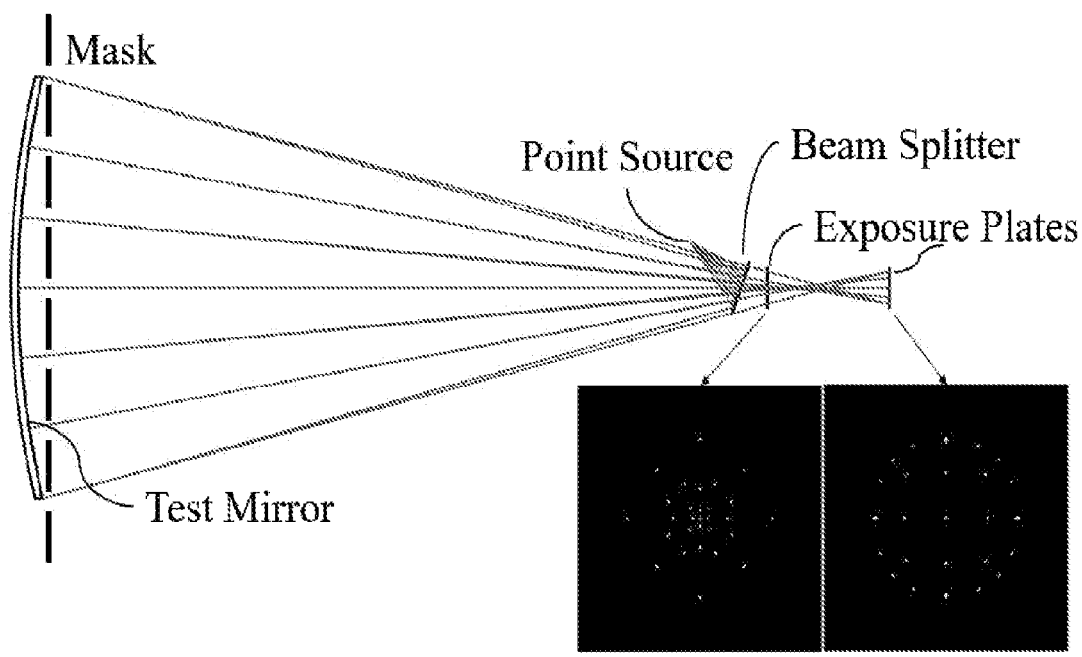
FIG. 12 shows a center of curvature Hartmann measurement layout. A point source is reflected into the beam path by a beam splitter, according to an embodiment of the present invention.

Preliminary Laser Hartmann Measurement: The traditional Hartmann method involves placing a point source near the center of curvature of a concave mirror and covering the aperture of the mirror so that light reflects only from an array of holes. Thus, the pupil is sampled over a collection of discrete points. Two photographic exposures are taken near the focus of the mirror, one before the focus and the other after. Traditionally a well collimated light source has been used for Hartmann measurements, thus for a parabolic mirror there is ideally no spherical aberration observed. However, measurement from the center of curvature is also possible. By correlating pairs of spots on the photographic plate the wavefront slope error at a particular hole (i.e. pupil position) can be measured (FIG. 12). FIG. 12 shows a center of curvature Hartmann measurement layout. A point source is reflected into the beam path by a beam splitter, according to an embodiment of the present invention. Light is reflected only across an array of holes due to a mask covering the test mirror. This reflected light then passes through the beam splitter and passes through two different exposure plates. By correlation of pairs of spots between the plates the surface slope error can be determined. In this case, a parabolic surface is being tested, thus spherical aberration is present.

The problem with the Hartmann method is a significant loss of incident light, which leads to a lower signal to noise ratio. Additionally, creating an aperture mask with holes to cover meter class optics is rather cumbersome. Using the so-called Laser Hartmann method, these challenges of the traditional Hartmann method are overcome by using an array of lasers to sample the pupil. A high signal to noise ratio is then attainable and there is no need for a large covering for meter-class optics.

Figure 13:
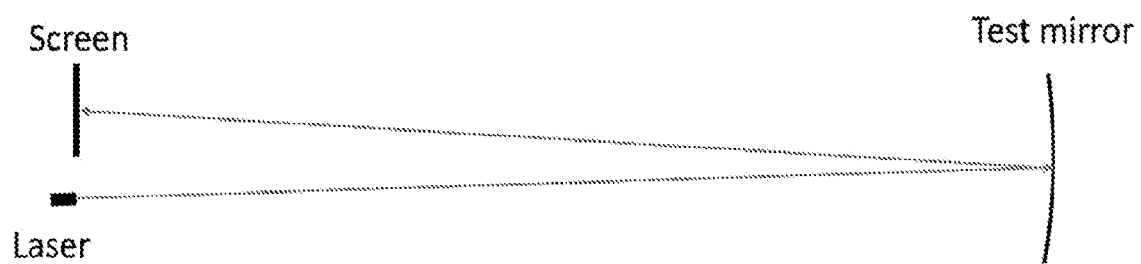
FIG. 13 shows an initial experiment with laser Hartmann metrology, according to an embodiment of the present invention.

There are two different approaches to the laser Hartmann method. The first approach involves steering a single laser across the aperture and measuring the reflected spot location for each aperture position. The second method involves creating an array of lasers that are precisely positioned and passing each beam through an imaging lens to image the laser array onto the test mirror. An initial experiment was performed using this first method. A single laser was placed near the center of curvature of a mirror (150 m). A screen was placed close to the laser. Based on the reflected laser spots each associated with a pupil position, the slopes across the mirror were calculated, and the surface integrated (FIG. 13). The results of the experiment revealed a few important reasons why a fixed laser array was more desirable. FIG. 13 shows an initial experiment with laser Hartmann metrology, according to an embodiment of the present invention. A laser was steered to direct the beam to positions across the test mirror, and the reflected spot was measured at the screen. The distance from the laser to the mirror was 150 m.

First, steering the single laser was time consuming. Each position required >20 seconds and two people. A measurement with 37 lasers would then require >10 minutes. This amount of time was not unreasonable, but the process was quite cumbersome. Second, a high level of mechanical precision was required (<¼ of an arcminute). This involved using screw actuators on large cantilever beams held in place by springs. Making such a system that was automated would have been ideal but would have required additional time and funding. Third, the size of the free-space propagating laser beam expanded significantly over 150 m.

By gaussian beam propagation theory, the laser has approximately a spherical wavefront as it expands towards the test mirror. The laser used was 550 nm with a beam waist size of approximately 1 mm, found inexpensively online. The Rayleigh range of a gaussian beam laser is expressed by equation (2).

$$Z_0 = \frac{\pi w_0^2}{\lambda}, \quad (2)$$

where $w_0$ is the initial beam waist diameter and $\lambda$ is the wavelength. The Rayleigh range of a laser is associated with the distance at which the beam size has expanded to twice the area of the initial beam spot. When propagating a laser beam over a greater distance, the beam waist diameter is determined by equation (3).

$$w(Z) = w_0 \sqrt{1 + \left(\frac{Z}{Z_0}\right)^2}. \quad (3)$$

In our experiment, the Rayleigh range of the laser was 5.7 m. Thus, the beam waist size can be approximated by equation (4).

$$w(Z) = \frac{w_0 Z}{Z_0} = \frac{\lambda Z}{\pi w_0}, \quad (4)$$

which shows that the beam waist size grows in proportion to the distance traversed when that distance is much greater than the Rayleigh range.

In the actual experiment the beam expanded from approximately a 1 mm spot to 1", close to the prediction of gaussian beam theory of 20 mm. If the mirror had been perfectly flat, then the beam would have been ~52 mm when it reflected back to the screen. If the mirror had been perfectly spherical then the beam should have been near 1 mm, the same as the output. However, the mirror was mounted in a similar fashion to the final heliostat, glued on a series of pads, which bent a flat mirror into the ideal shape. This naturally introduced errors into the surface.

Figure 14:
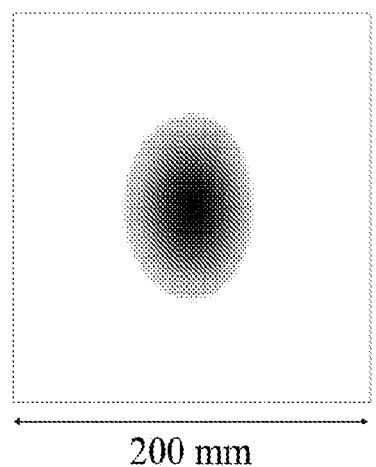
FIG. 14 shows a geometric spot for 150 m radius of curvature heliostat with periodic ripple, according to an embodiment of the present invention.
Figure 15:
FIG. 15 shows a laser spot formed near center of curvature of a heliostat mirror, according to an embodiment of the present invention.

FIG. 14 shows a geometric spot for 150 m radius of curvature heliostat with periodic ripple, according to an embodiment of the present invention. The ripple was modelled using Chebyshev polynomials. The maximum size of the beam grows from 1 mm at the laser to ~40 mm at the screen. Using a FARO arm the initial shape of the mirror was set. Based on surface measurements, there was a periodic ripple across the surface of the mirror with a PV amplitude of approximately 0.4 mm. Modelling this in Zemax (using Chebyshev polynomials) shows that the geometric spot size (FIG. 14) is much greater than the ideal return beam size of 1 mm. The beam grows to ~40 mm. Yet in the measurement process, the observed laser beam size was even larger (FIG. 15). FIG. 15 shows a laser spot formed near center of curvature of a heliostat mirror, according to an embodiment of the present invention. The picture is approximately 4 feet square. The core of the spot was about 1 foot in diameter surrounded by many fluctuations. This is much greater than what was expected, and thus deserves some explanation.

The heliostat mirror for this experiment was a piece of glass that was intended for architectural use. Therefore, high frequency ripples could have been present across the surface. This is the most likely reason for the beam spread. Additionally, there was dust covering the mirror because it had been outside for several days. This caused the fringes observed in the laser spot because the screen was located at the ideal focus of the mirror (i.e., the Fourier transform of the aperture was located at the screen). One other explanation is wind. The wind was blowing, which caused the heliostat to vibrate during each measurement and caused deviations in the laser beam path. Thus, parts of the laser beam refracted away from the core.

Figure 16:
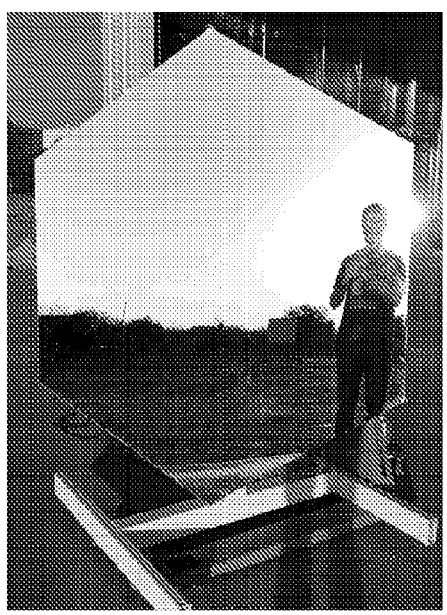
FIG. 16 shows a Front view of prototype actively focused heliostat, according to an embodiment of the present invention.

Despite this large spot size, it was possible to measure the surface of this heliostat using this laser Hartmann metrology method. Low order surface errors were measured to within 0.5 mrad, which was less than the desired 0.2 mrad. Given the large increase in spot size and the tedious nature of moving the laser beam manually, modifications were made to this experiment to increase the speed and reduce the environmental factors affecting the measurement. Thus, a fixed array of lasers was used to measure the final heliostat (FIG. 16). FIG. 16 shows a Front view of prototype actively focused heliostat, according to an embodiment of the present invention.

Changes to Laser Hartmann Measurement: The traditional Hartmann measurement involved photographic exposures a few minutes each, also requiring very careful placement of the films so that the measurement was accurate. The time for measurement can be optimistically approximated as ~10 minutes, most of which was idle. This is of course the physical measurement only, not the time to setup the experiment. The mechanical laser Hartmann measurement required >10 minutes for a full aperture measurement, most of which was active, though the process could be automated. In contrast, using a laser array controlled by a computer, it is possible to obtain a Hartmann measurement of a heliostat mirror in a couple seconds. In addition to changing the movable laser to a fixed laser array, a few beneficial changes were made to the experiment.

Figure 17:
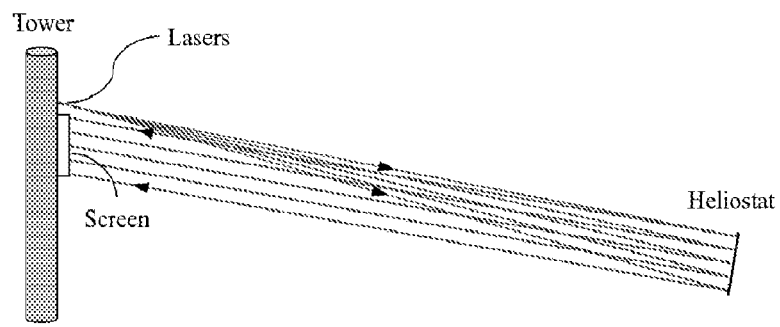
FIG. 17 shows an in-situ metrology system using the laser Hartmann technique, according to an embodiment of the present invention.

One change to this experiment was making it truly in situ. Heliostats reflect sunlight towards a central tower. Therefore, an in-situ measurement involves measuring the shape of the heliostat from the tower. Thus, the lasers for this Hartmann measurement would ideally be placed at the focus of each heliostat (FIG. 17). FIG. 17 shows an in-situ metrology system using the laser Hartmann technique, according to an embodiment of the present invention. Lasers, mounted to a power tower, are near the focus of a heliostat, and direct beams onto the heliostat. Light is reflected from the heliostat and is incident upon a screen. Positions of the spots on the screen are recorded and slope errors of the heliostat can be calculated. For a spherically shaped heliostat the returning beams would then be collimated and spread across an area similar in size to the heliostat.

In reality, shape errors spread the beams even more and the ideal screen should be twice the size of the heliostat. The addition of a large screen is not ideal, but there are significant advantages to this geometry. By placing the lasers at the focus of a heliostat, the effects of any shape errors are reduced by a factor of two (traversing half the distance compared to a center of curvature measurement). Thus, the spot size increase due to high frequency slope errors is less. Also, all the heliostats in a field can be measured from the same location. An additional advantage is that the spot on the screen is no longer the Fourier transform of the pupil (i.e., fringes from dust particles are not observed). Clearly, this geometry is more favorable provided the screen does not become too large.

In this experiment, there were still complications with using high quality lasers alone. First, the total cost of a laser array composed of 37 high quality lasers is in the thousands of dollars. Second, each laser needs to be angularly positioned with high accuracy. Third, using such an array on a heliostat field would require motion of each laser when measuring heliostats at different distances.

Figure 18:
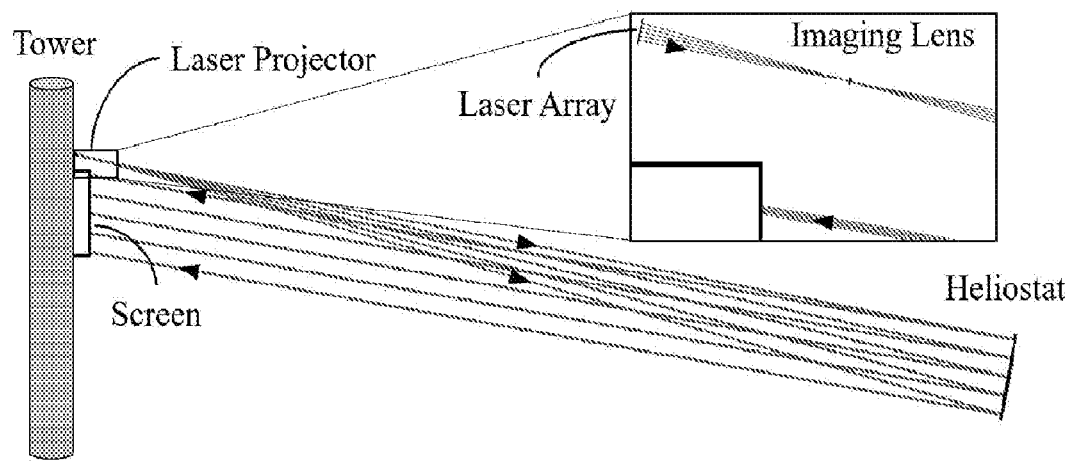
FIG. 18 shows an in-situ laser Hartmann metrology system, an imaging lens acts as a projector to focus the laser beams onto the surface of the heliostat, according to an embodiment of the present invention.

A simple optics trick was used to get around these problems by using a lens to image an array of cheap diode lasers onto the heliostat (FIG. 18). FIG. 18 shows an in-situ laser Hartmann metrology system, an imaging lens acts as a projector to focus the laser beams onto the surface of the heliostat, according to an embodiment of the present invention. In this manner the gaussian beam expansion of the laser is reduced, and the only precision required is in the placement of the lasers. The advent of the diode laser has led to the high-volume production of monochromatic, reasonably collimated, bright, and inexpensive light sources. The laser size is 3×1 mm and the divergence varied between 1 and 5 mrad.

Aiming an array of lasers at a lens is straightforward and does not require high precision. In fact, using a lens means the laser does not even need to be well-collimated! Thus, the array can be composed of laser diodes and the cost can be significantly reduced. The only precision needed is in the machining of the laser array.

The imaging lens is essentially acting like a projector lens, where the selection of the lens is determined by the desired magnification. For a good sampling, the spot size of each laser would ideally be similar to the size of the output laser. However, if this were the case then any angular divergence in the initial laser beam would be similarly present in the beam reflecting from the heliostat. Étendue is the name of the game. Some of the purchased diode lasers had a beam divergence of ~5 mrad. Across distances >100 m such a beam would expand to >0.5 m and the spot would be challenging to detect. Of course, there is also the practicality issue associated with using a lens with a >25 m focal length, which would be required for one to one imaging. Therefore, it is advantageous to select a lens that magnifies the size of the spots.

For example, magnifying the laser size by a factor of 20 with a lens reduces the divergence of the beam by the same factor. Thus, for the worst-case laser (5 mrad divergence), the beam divergence would be 0.25 mrad and the beam would expand by about 1" across 100 m rather than half a meter. This comes with the cost of a much coarser sampling of the heliostat, but sampling across ~1" sections on the heliostat mirror was all that was required for this experiment. Due to gaussian expansion this is in fact close to the best that could be done with a 1 mm aperture higher quality laser.

This smaller divergence of the laser beam can also be explained by gaussian beam propagation theory. Imaging the lasers onto the mirror creates the equivalent situation of a series of large lasers emitting from the heliostat mirror with the angular direction determined by the local slope of the heliostat mirror. In this manner, the initial gaussian beam waist is 1". Thus, the Rayleigh range is >5 km. The gaussian beam expansion is very small across distances of a few hundred meters. The only added expansion of the laser beam is associated with the surface error of the mirror.

The initial experiment used architectural mirrors with large high frequency slope errors. The final experiment used mirrors from Rioglass Solar, which are intended for heliostat use. With an initial slope error <1 mrad, the laser beam would in the worst case expand by 100 mm across 100 m. The low order slope errors associated with the bending of the heliostat mirror only change the direction of the beam, not the size. There is of course a caveat to that statement. The locally induced curvatures across the mirror are generally toroidal due to the ideally toroidal shape of a heliostat at large angles of incidence. Therefore, local astigmatism in the surface causes the beam shape to be altered slightly, but this effect tended to reduce the spot size rather than increase it.

The Laser Array: For the actual measurement of the fully functional heliostat, the focal length of the heliostat was chosen to be 40 m. According to FEA analysis, this was a good focal length for high concentration while minimizing surface errors. Thus, the laser beam expansion in the worst case was 40 mm (if the high frequency errors in the heliostat mirror were 1 mrad), and essentially nothing due to gaussian beam propagation.

Figure 19:
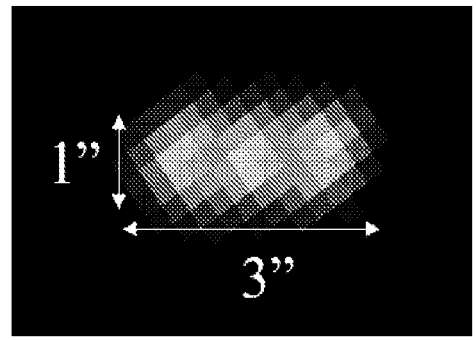
FIG. 19 shows an example spot size at the mirror, according to an embodiment of the present invention.

The diode lasers used in this experiment were of an interesting form where the spot size was rectangular in shape with 1 mm by 3 mm diameter at the laser, though the laser aperture was axially symmetric and about 3 mm in diameter. The imaging lens was imaging the laser aperture; thus, the size of the laser spots was determined by the laser aperture, not the size of the laser spot. Somewhat arbitrarily, to obtain 20× magnification of the lasers the ideal focal length lens was 2 m and the beam sizes at the mirror were roughly 2.5" (FIG. 19). This was not a problem because the Hartmann slope calculations rely upon the centroid of the spot. FIG. 19 shows an example spot size at the mirror, according to an embodiment of the present invention. Note, pixels with values less than half the maximum pixel value were filtered to reduce the effects of stray light. Thus, the full size of the spot is not shown.

Figure 20:
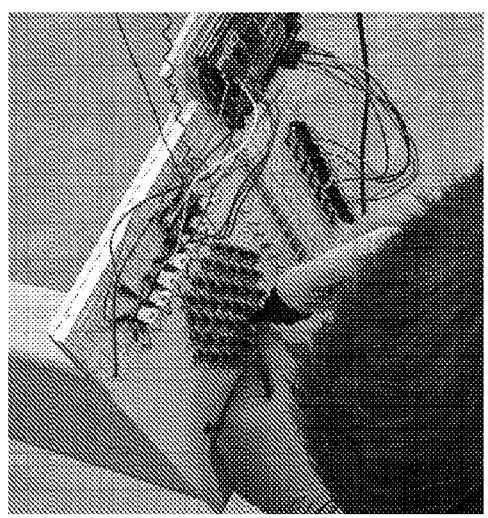
FIG. 20 is a picture showing the process for aligning laser diodes and gluing them in place, according to an embodiment of the present invention.

Concerning the focusing lens, in the worst-case beam expansion of 5 mrad a laser spot is ~1" in diameter, thus a 1" diameter lens was suitable. Most of the lasers were roughly the same size at the lens as when they exited the laser (~3 mm). Thus, the lasers needed to be positioned only with ~⅓ of a degree precision, almost two orders of magnitude less precise than in the mechanical laser Hartmann experiment. In this manner, the lasers were placed in precision machined holes and glued in place with UV curing glue, all by hand (FIG. 10). FIG. 20 is a picture showing the process for aligning laser diodes and gluing them in place, according to an embodiment of the present invention. The distribution of the holes was determined by the magnification of the imaging lens and the shape of the heliostat, which was hexagonal.

Simply turning on each of the lasers in turn via the laser controller and observing their location within the lens was all that was needed to verify alignment. Turning on all the lasers together showed that most of the laser light was passing through the clear aperture of the lens. Additionally, a projected pattern of the lasers onto the heliostat mirror, made visible by an array of overlaid Lambertian surfaces, showed that the image of the laser array was properly formed on the heliostat mirror (FIGS. 21A-21C). FIG. 21A shows a laser array composed of diode lasers each turned on, according to an embodiment of the present invention. FIG. 21B shows a laser spots with most of the light passing through the clear aperture of the lens, according to an embodiment of the present invention. FIG. 21C shows a projected laser spots incident upon the heliostat mirror, according to an embodiment of the present invention. The distribution of diode lasers was chosen according to the shape of the heliostat mirror and the magnification provided by the imaging lens.

Creation of the laser controller presented unique challenges itself. First, it was determined that to uniquely identify each spot for a measurement, each laser needed to be turned on sequentially. This was necessary because in many situations the laser spots were intersecting on the screen. Thus, it was important to be able to quickly turn on and off each laser in a precisely timed manner. An Arduino Mega 2560 was suitable for this, especially since the diode lasers only required 5V to function. Therefore, an Arduino by itself could control the lasers by turning on and off digital output pins. However, controlling 37 lasers each with their own circuit would have been very messy. It was determined that N-type MOSFETs should be used in an array controlled by the Arduino.

An N-type MOSFET is essentially a variable resistor dependent on the input voltage to the "gate" pin of the MOSFET. FQP3ONO6L N-type MOSFETs were used because when applying a 5V voltage to the gate, the resistance of the MOSFET is nearly zero, and when no voltage is applied to the gate (0V) the resistance is very large (FIG. 22). FIG. 22 shows a FQP30N06L N-type MOSFET, according an embodiment of the present invention. If used as a supply to a laser, the "source" pin is connected to the 5V voltage supply of the Arduino and the "drain" pin is connected to the positive lead of the laser. If used to close the circuit, the "source" pin is connected to the negative lead of the laser and the "drain" is connected to ground. The number of lasers that can be controlled then goes as the square of the number of pairs of MOSFETs. This is illustrated in FIG. 23.

Figure 23:
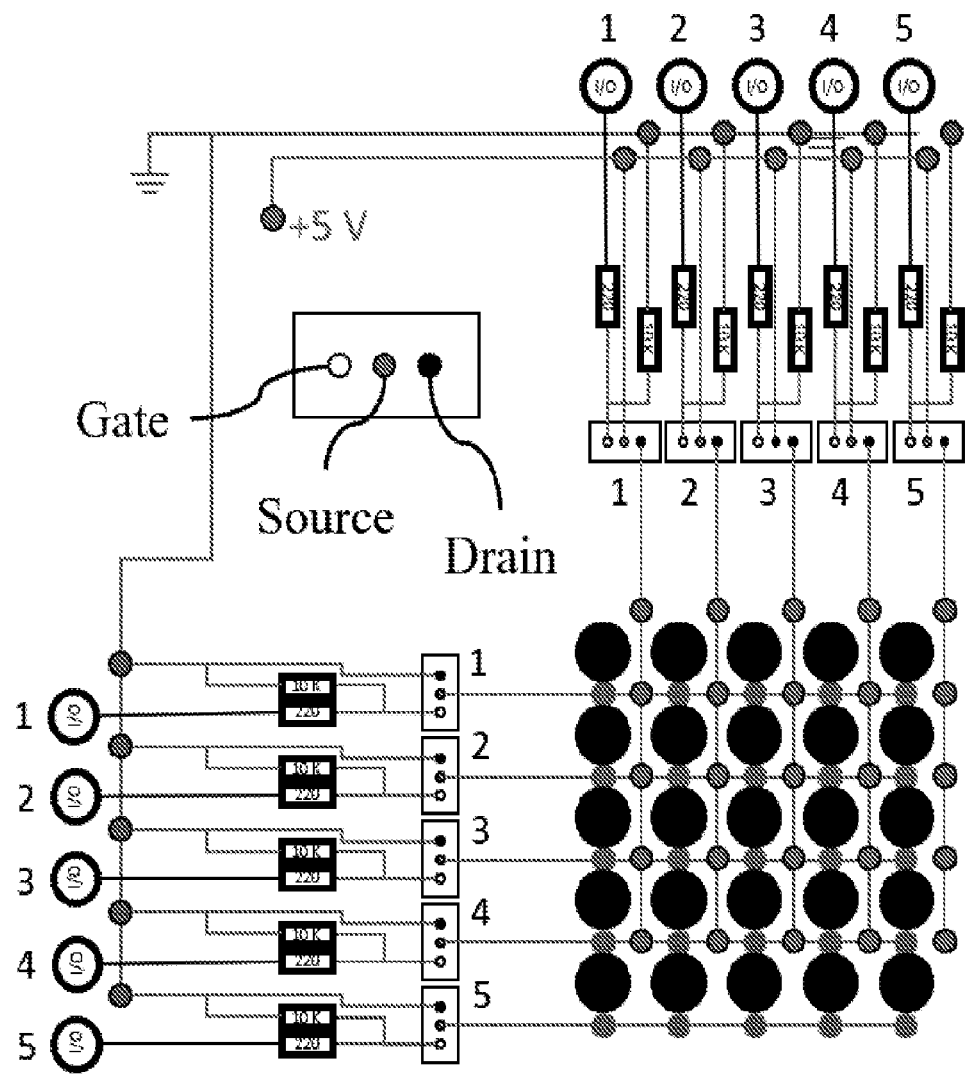
FIG. 23 is an example circuit showing how to control 25 lasers with 10 digital input pins of a microcontroller, according to an embodiment of the present invention.

FIG. 23 is an example circuit showing how to control 25 lasers with 10 digital input pins of a microcontroller, according to an embodiment of the present invention. Resistors are used to ensure digital pins are not overdrawn on current, and to ensure the gait voltage drops to zero when the digital pin turns off. Five "hot" lines are created, each activated by their own MOSFET. Five "cold" lines are also created each with their own MOSFET. The red circles in the 5×5 array are each connection points for the positive lead of a laser diode, and the blue circles in the 5×5 array are each connection points for the negative lead of a laser diode. If the pin in column 2 turns on, then the red wire in column 2 becomes hot, but no current can flow because the resistance on all the blue lines is "infinite". If the pin in row 5 is then simultaneously turned on, the resistance in the blue wire in row 5 drops to nearly zero and current can flow through the laser diode. This figure represents an example circuit showing how to control 25 lasers with 10 digital input pins of a microcontroller. Five positive lines in red (vertical lines) are created, each activated by their own MOSFET. Five negative lines in blue (horizontal lines) are also created each with their own MOSFET. The red circles in the 5×5 array are each connection points for the positive lead of a laser diode, and the blue circles in the 5×5 array are each connection points for the negative lead of a laser diode. If the pin in column 2 turns on, then the red wire in column 2 becomes hot, but no current can flow because the resistance on all the blue lines is "infinite". If the pin in row 5 is then simultaneously turned on, the resistance in the blue wire in row 5 drops to nearly zero and current can flow through the laser diode in row 5 column 2.

Using this type of arrangement, the number of lasers that can be controlled is equal to the number of row pins times the number of column pins. Thus, if a laser array were made for a large 36 m$^2$ heliostat, and 400 lasers were needed to obtain the desired sampling, only 40 pins would be required, and the laser array could be controlled by one Arduino Mega 2560. In the actual arrangement only 37 lasers were needed, thus only 13 pins would have been required. However, to simplify circuitry 14 pins were used, which could have controlled 49 lasers. Due to the geometry of the heliostat (i.e. the heliostat being hexagonal), the corner lasers were unnecessary and only 37 lasers were required. The gridded approach was still used due to its clean wiring.

Measurement Calculations: The laser array was only one part of the full metrology system. The rays reflected from the heliostat mirror needed to be sufficiently visible on the receiving screen so that a scientific camera could capture an image of each spot. A Mako U 1.3MP monochrome camera was chosen using a 35 mm F/1.65 fixed focal length C series lens from Edmund Optics.

The size of the screen was 8 ft by 8 ft, close to twice the size of the hexagonal heliostat (1350 mm flat to flat). A retroreflective material was used for the screen so that spots were very visible when the camera viewed the screen from the heliostat direction. Mapping the screen onto the camera sensor gave a resolution of about 2.4 mm per pixel; plenty of resolution to measure the >2" laser spots. The maximum speed of a single measurement was throttled by the maximum frames per second of the Mako U camera, which was ~160 FPS. Additionally, the camera operated with significant fluctuations in FPS. Due to the poor timing of Windows 10, the camera needed to take two pictures for each laser flash to guarantee an image was captured when one of the lasers was on. Thus, for 37 lasers a minimum of 74 images was required. At such a speed, the physical measurement took less than one second. Note, the Arduino laser controller could flash lasers at >1000 times per second, but this would require a poorly timed camera to take images at 2000 FPS. The exposure times would then be ~$\frac{1}{2000}^{th}$ of a second, perhaps too short to obtain good data.

To calculate the local slope across the aperture of the heliostat a knowledge of the geometry of the laser array, heliostat, and screen were necessary. The calculation then involved referencing the positions of all the spots relative to the center spot position. In order to measure the center spot positions, the centroid of each spot was calculated. This involved a weighted sum of the pixel values where the weighting factor was the pixel position. Converting the pixel positions to real space distances then provided the physical location of the laser spots on the screen. These centroid calculations for the x and y dimensions were derived using equations (5) and (6).

$$Cx = \frac{\sum P(x_i) x_i}{\sum P(x_i)} \quad (5)$$

$$Cy = \frac{\sum P(y_i) y_i}{\sum P(y_i)}, \quad (6)$$

where $x_i$ and $y_i$ are the pixel numbers/positions and P is the pixel value at the associated pixel positions. Thus, the laser spot locations on the screen were measured, and the slope could be calculated.

Figure 24:
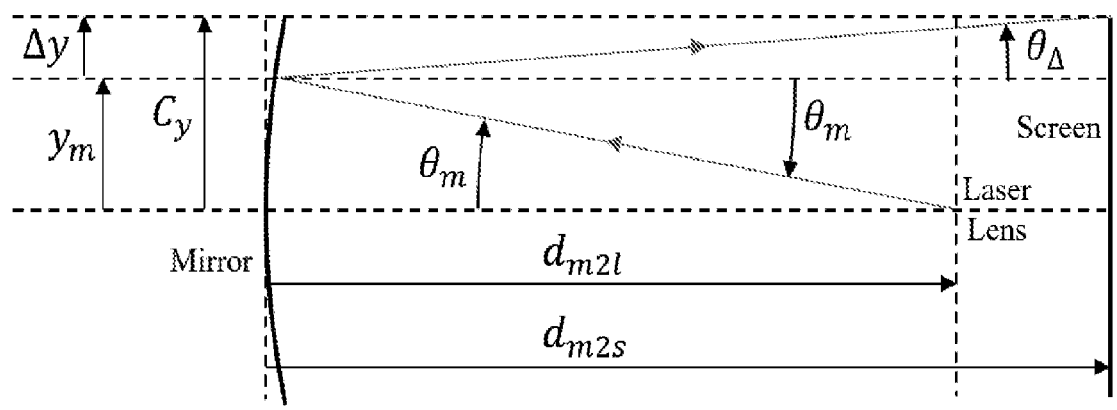
FIG. 24 shows a geometric illustration of the laser path from the laser lens to a pupil position in the mirror to the screen, according to an embodiment of the present invention.

The slope calculation was performed in two dimensions independently. FIG. 24 shows a geometric illustration of the laser path from the laser lens to a pupil position in the mirror to the screen, according to an embodiment of the present invention. This path forms a triangle with an apex angle that is twice the slope of the mirror. In FIG. 24, a beam leaving the laser lens traverses the distance from the laser lens (imaging lens) to the mirror. This distance is very large compared to the sag of the mirror; thus, the sag can be neglected (especially since all that was needed is 0.2 mrad precision). The laser then reflects from the mirror and traverses the distance from the mirror to the screen, which is not necessarily the same distance as from the lens to the mirror. The laser is incident upon the screen and measured and the location of the laser spot is calculated. A triangle is formed by this path with an apex angle that is twice the slope of the mirror at the reflected location. Therefore, the equation for the slope of the mirror at a given pupil position is provided by equation (7).

$$S_y = \frac{y_m}{2d_{m2l}} + \frac{\Delta y}{2d_{m2s}}, \quad (7)$$

where $y_m$ is the marginal ray height, $\Delta y$ is the change in height of the laser from the marginal ray height, $d_{m2l}$ is the distance from the mirror to the lens, and $d_{m2s}$ is the distance from the mirror to the screen. Due to the need to separate the lens from the return laser beam path, the actual geometry involves offsetting the screen and laser lens, and the marginal ray heights and change in ray heights are all referenced relative to the central beam.

With the slopes calculated, the RMS slope error for a given measurement was readily apparent. However, this RMS slope error was only for the low frequency shape errors in the mirror. The initial high frequency errors of the mirror were neglected. Knowing the slope error did not make it easy to know what the sag error in the mirror was. Knowledge of the sag error was necessary for knowing how to change the actuators' settings. Therefore, software from Brookhaven National Laboratory was integrated into the software to take the slopes in x and y and their associated positions on the mirror. From this information the slopes were integrated to form a full surface map. Due to the low sampling of the mirror, the software did not provide accurate results. To fix this, the slopes were cubic interpolated using MATLAB's built-in function, gridded Interpolant, before being integrated.

The Laser Hartmann Measurement: The laser Hartmann measurement thus consisted of the following steps: establish the geometry, align the laser array to the mirror, adjust the tip and tilt of the heliostat mirror to reflect the laser beams onto the screen, calibrate the camera, send a remote signal from the computer to the Arduino to run a preestablished program that flashes the lasers in sequence with a precalibrated timing, capture images with the camera, process the images to identify relevant data, calculate the laser spot centroids, calculate the slopes in two dimensions for all 37 laser spots, integrate the slopes with BNL software, compare the measured sag to the ideal sag, and calculate surface errors.

The setup time for a given measurement was in the vicinity of 30 minutes to an hour. This included determination of the ideal shape by entering a date, time, and geometry for the Heliostat on Sun. The ideal shape was thus automatically calculated in MATLAB. With everything properly setup in the software and hardware a single click initiated a measurement. From that click to obtaining the surface error took less than 30 seconds, most of which was spent in establishing connections with the computer to the camera, connecting to the signal transmitter, sending a transmission, and post processing the data. The time over which the lasers flashed was less than 1 second. After connections were established the first time, additional clicks led to surface error measurements in less than 15 seconds.

The process of adjusting the heliostat towards the ideal shape then became the bottleneck. The initial shape setting was the lengthiest process since all 18 pads needed to be adjusted sequentially. This would have taken >2 hours using the mechanical laser adjustment method. Using the laser array, the process took less than 30 minutes.

Figure 25:
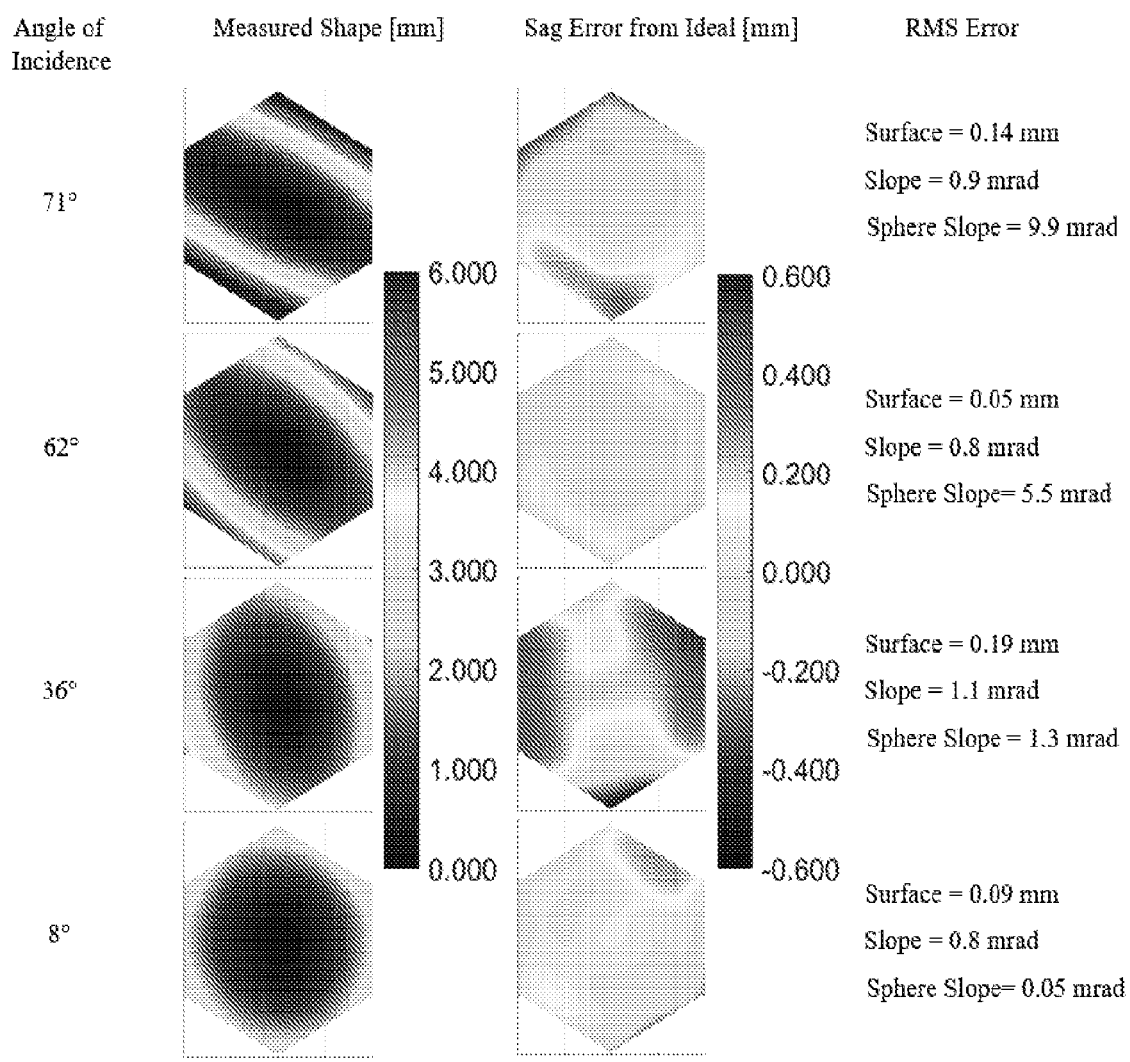
FIG. 25 shows a Matrix of surface measurements showing the final adjusted shape of the heliostat for four different solar positions after iterations towards the ideal shape, according to an embodiment of the present invention.

After establishing the initial shape of the heliostat, other shapes for different times of day were obtained by adjusting solely the three linear actuators. Again, the laser Hartmann measurement was used to quickly determine shape errors. This process was much faster than the initial shape setting. In this manner, the heliostat was set to four different shapes for four different solar angles of incidence (FIG. 25). FIG. 25 shows a Matrix of surface measurements showing the final adjusted shape of the heliostat for four different solar positions after iterations towards the ideal shape, according to an embodiment of the present invention. Left column is angles of incidence, which vary from nearly on-axis to >70 degrees. The second column is the measured surface shapes, which vary from highly toroidal to nearly spherical. The third column is the surface shape errors. The fourth column is the RMS errors of the heliostat mirror for surface sag, surface slope, and the slope error if a perfect sphere were used.

Three out of the four heliostat surface shapes had less than 1 mrad RMS slope error relative to the ideal surface shape. If the surface had not been actively bent into shape, and instead had been a perfect sphere, the RMS slope errors would have been as bad as 9.9 mrad. Even at a moderate angle of incidence of 36° the slope error of a perfect sphere is 1.3 mrad and the ideal error budget has been used up. Note, the surface slope errors consist of a coupling of the slope errors in x and y. All RMS errors were calculated by square rooting the mean of the square values minus the mean of the values squared, as in the following equation (8).

$$\sigma_x = \sqrt{\langle x^2 \rangle - \langle x \rangle^2}, \quad (8)$$

where x is the quantity under consideration. The total RMS surface slope error was then calculated by taking the modulus of the RMS slope errors in x and y.

After setting the heliostat surface shape as close as possible to the ideal shape, the next test was taking the heliostat out into the sunlight and focusing the light onto a target 40 m away. In this experiment the target was to the East. The Sun reflected at angles varying from 8 degrees to 71 degrees. The resulting solar images were well corrected and obtained concentrations of >90% ensquared energy into 0.5 m, a concentration of nearly 6× over a large range of angles (see FIG. 26). The heliostat was bent close to the ideal shape, and then allowed to relax to the initial set shape. In this manner, the benefits of bending a heliostat were manifest.

Figure 26:
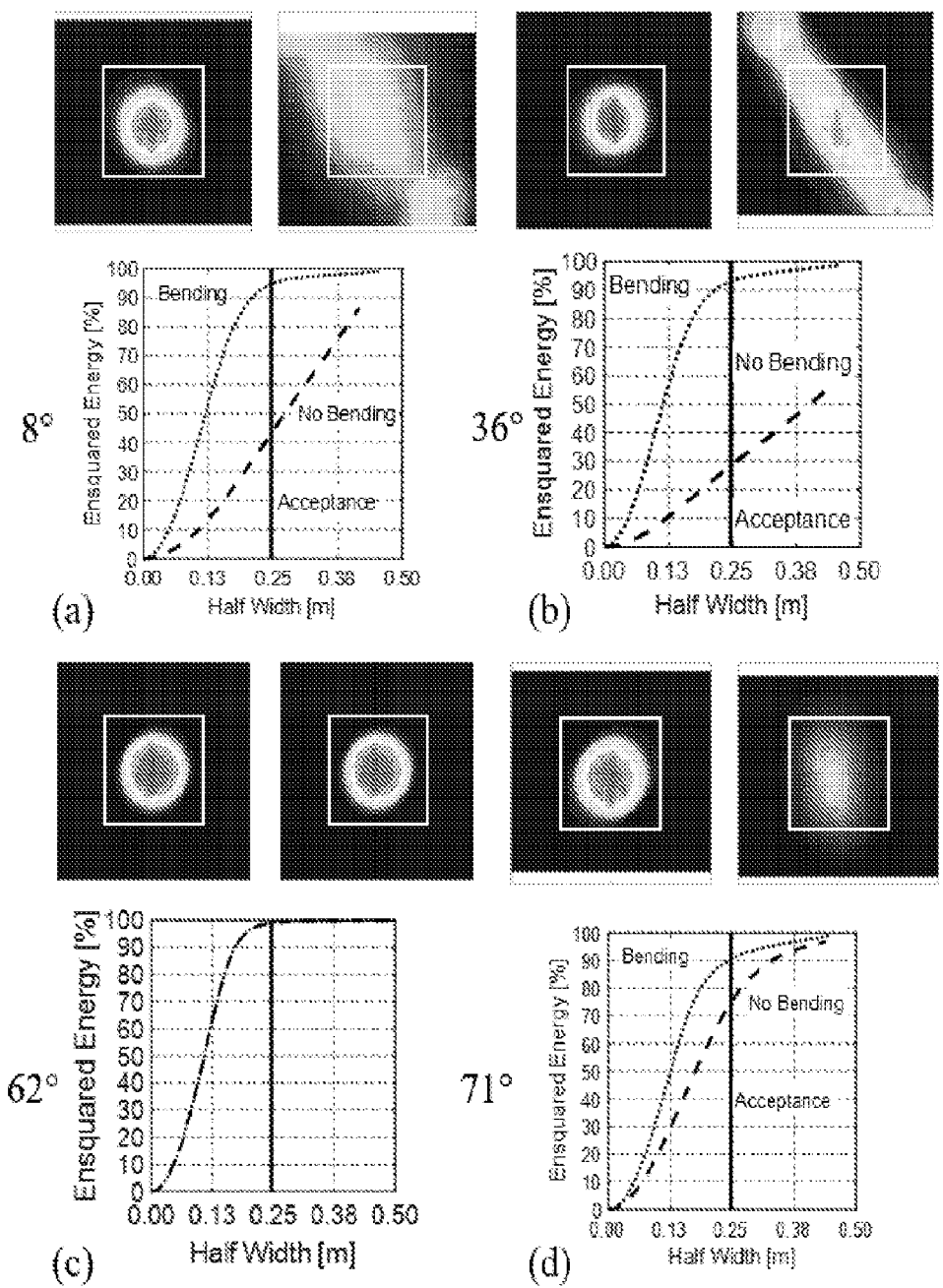
FIG. 26 shows solar images for each angle of incidence considered categorized by subsections: (a) 8°, (b) 36°, (c) 62°, and (d) 71°, according to an embodiment of the present invention.

The solar images were each measured using the same scientific camera used for measuring the laser spots. A neutral density filter was placed in front of the lens so that the exposure did not saturate the sensor. FIG. 26 shows solar images for each angle of incidence considered categorized by subsections: (a) 8°, (b) 36°, (c) 62°, and (d) 71°, according to an embodiment of the present invention. The left solar image of each section is what is obtained by bending the heliostat frame with the three linear actuators. The right solar image of each subsection is what is obtained when no bending is induced by the three linear actuators. Below each set of solar images is their approximate ensquared energy in both the bending and no bending scenarios. The white box is 0.5 m square and represents a potential region of acceptance. The ensquared energies shown in FIG. 26 should be considered approximate since the measurement method and calculations did not consider precise radiometric quantities. An attempt was made to measure the screen with and without the solar image incident upon the screen, but due to a poor mounting scheme for the neutral density filter the background images could not be properly subtracted from the solar image measurements. Thus, a global subtraction of detector values was implemented where the subtracted value was determined by the average of a section of the target screen that appeared to not have any energy from the solar image.

The results of the laser Hartmann measurement clearly show that this method works. High solar concentrations were made possible by bending a heliostat mirror close to ideal toroidal shapes, active bending made possibly with only three linear actuators. It is possible to use this laser Hartmann metrology system in situ, opening the possibility for a power tower field of actively shaped focusing heliostats. Using such a field would allow for high concentration of sunlight using only a few hundred to a few thousand heliostats, thus making it possible to generate hydrogen fuel or increase the efficiency of power plants.

Future Metrology: The future of actively focusing heliostats is currently limited by heliostat metrology. If a rapid and sufficiently accurate metrology system(s) could be implemented, then the possibility of actively focusing heliostats becomes more concrete. In this section, a discussion of two commercial type heliostat metrology systems are proposed. The first is simply a modification of the metrology system already tested in a prototype setting.

Figure 27:
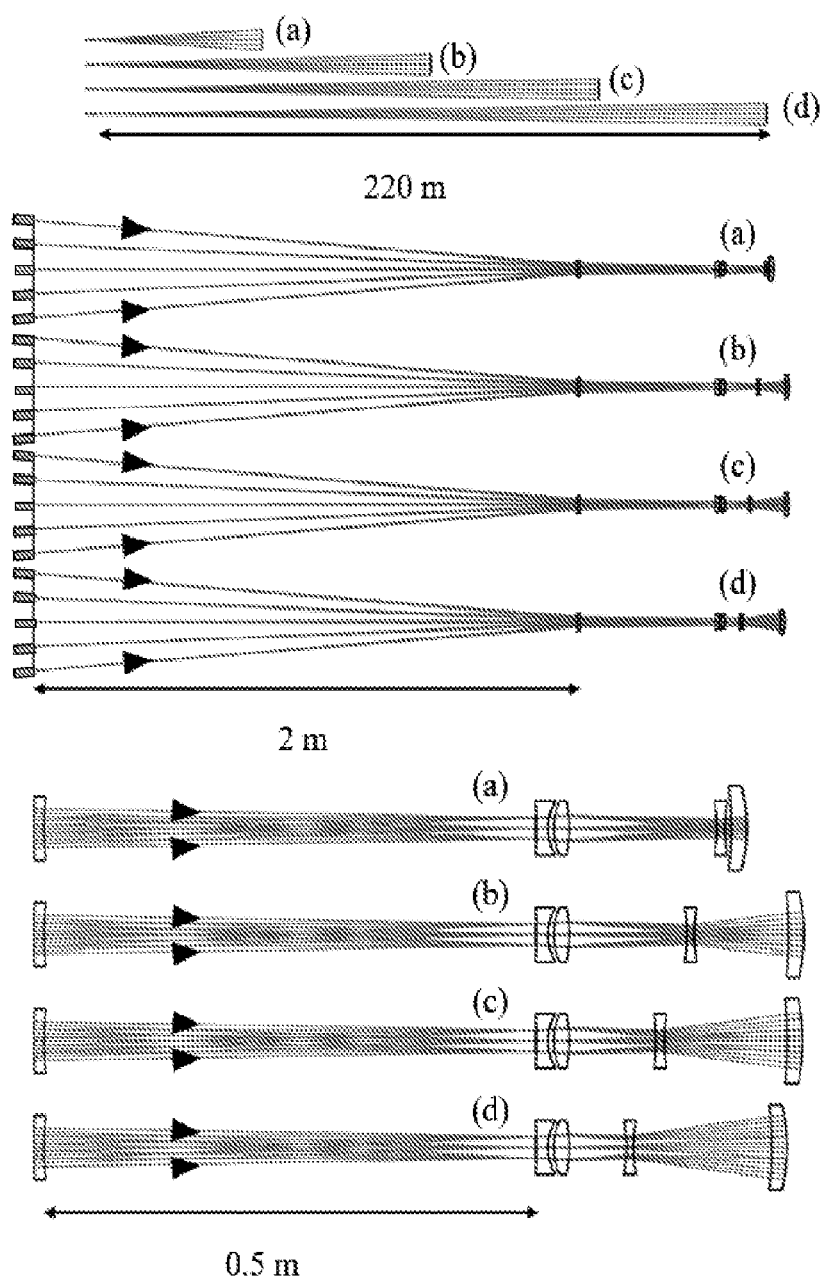
FIG. 27 shows a zoom lens used for laser Hartmann metrology at four different distances (a) 55 m, (b) 110 m, (c) 165 m, and (d) 220 m, according to an embodiment of the present invention.

A commercial laser Hartmann metrology system would need to be able to measure each heliostat in a large field, perhaps covering distances from ~50 m to ~200 m. Since it is ideal to keep the lasers all fixed in their pointing, such a system could use a zoom lens, where the outer elements act as a zoom beam expander (Donders telescope) and the back elements are fixed in relation to the laser array, acting as a telephoto lens. In the actual light path, a reverse telephoto lens images the laser array to a distant position followed by a variable beam expander that keeps the magnification constant for heliostats at varying distances (FIG. 27). FIG. 27 shows a zoom lens used for laser Hartmann metrology at four different distances (a) 55 m, (b) 110 m, (c) 165 m, and (d) 220 m, according to an embodiment of the present invention. The top images show the heliostat mirrors at the various distances in relation to the laser Hartmann metrology system. The middle set of images shows the laser diodes with positioning unchanged for each distance. The bottom set of images shows in detail the alterations to the lens between zoom positions. The only element distance that changes is between element 3 and element 4 and element 4 and element 5. A reverse telephoto lens is thus formed followed by a variable beam expander. The heliostat mirrors then reflect the laser beams to a screen near the laser array (perhaps mounted to the tower).

An inexpensive camera could then be mounted near each heliostat for measuring the laser spots, or a zoom lens mounted onto a drone could quickly move between heliostats for rapid measurements. In either scheme the measurement process would ideally occur at night where stray light is less likely to corrupt surface measurements.

Figure 28:
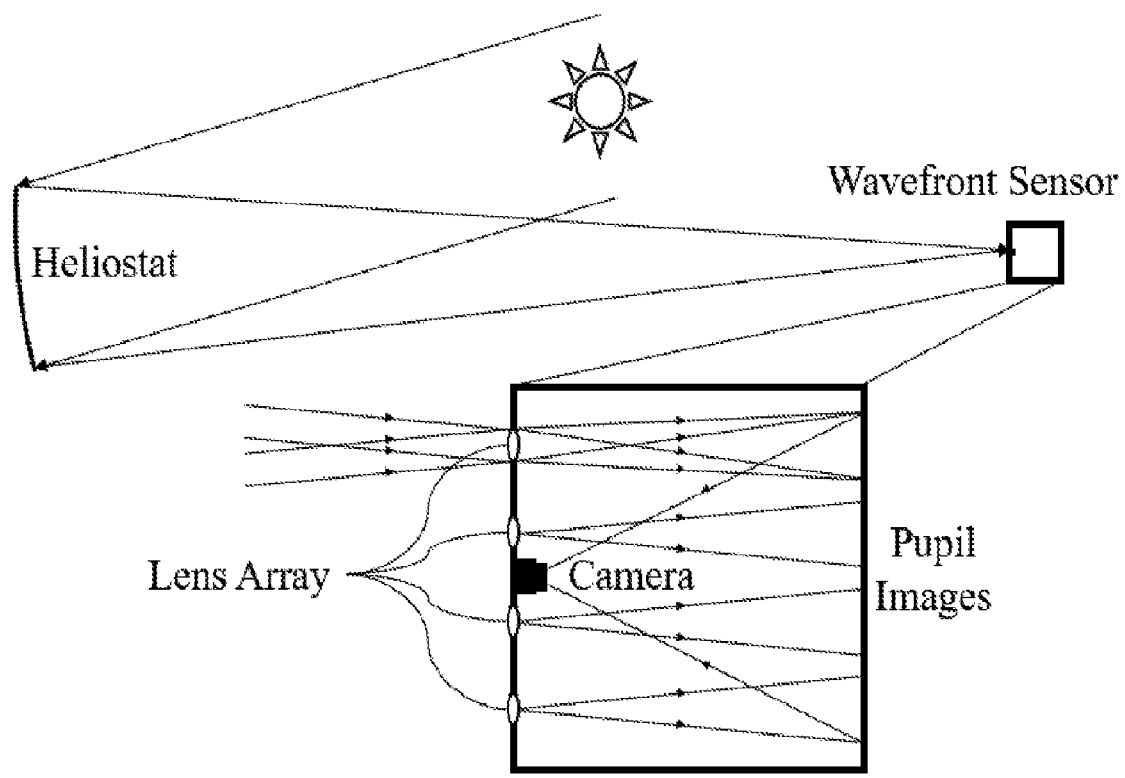
FIG. 28 shows a solar wavefront metrology system where a solar image is formed by a heliostat on a distant wavefront sensor, at the tower near the receiver.

A weakness of the laser Hartmann method is that it does not measure the gravitational deflection of the heliostat mirror, which varies with elevation angle. Ideally, the shape of the mirror should be measured when the heliostat mirror is oriented correctly to the Sun. Thus, a second metrology system is herein proposed, a solar wavefront metrology system (FIG. 28). FIG. 28 shows a solar wavefront metrology system where a solar image is formed by a heliostat on a distant wavefront sensor, at the tower near the receiver. The wavefront sensor consists of an array of lenses where each illuminated lens forms a pupil image. Measuring these images and processing the data leads to a slope error map, in a similar manner to a Pyramid scheme wavefront sensor.

Figure 29:
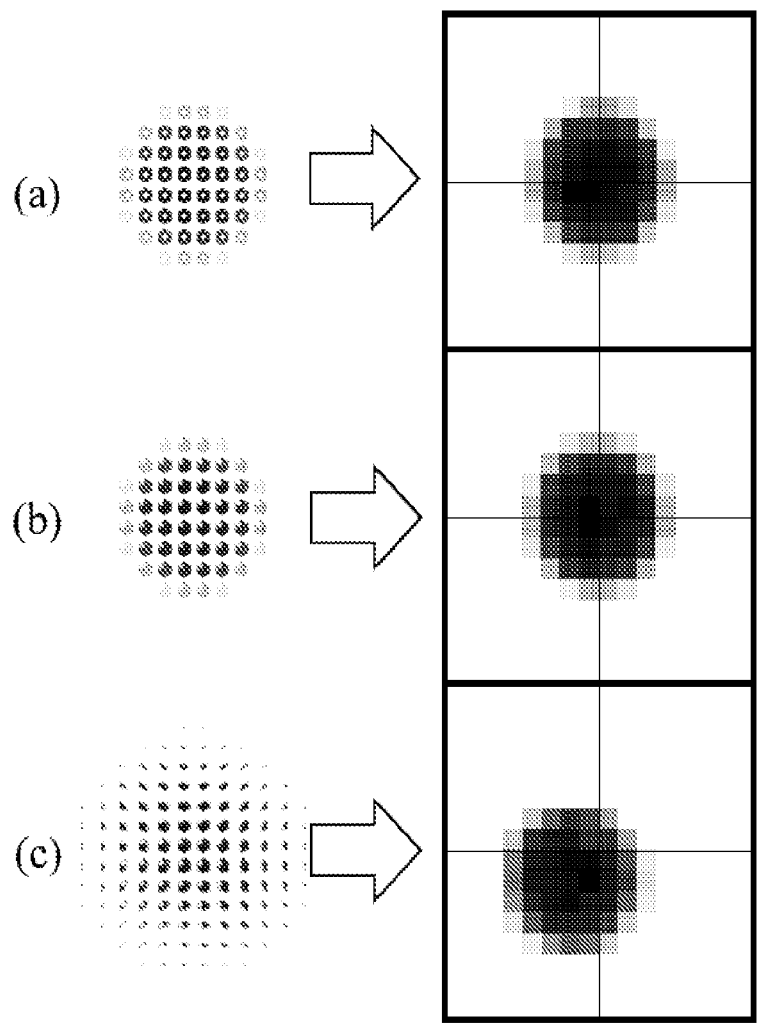
FIG. 29 An array of pupil images formed where an ideally shaped heliostat is used in (a) and (b) and an astigmatically aberrated heliostat is used in (c), sampling the pupil image array in (a) at the center of each pupil image recreates a low-resolution solar image, in (b) sampling an off-axis pupil position forms a low-resolution solar image that is centered at the same location, for (c) the same off-axis pupil location forms a solar image that is offset due to astigmatism in the surface, according to an embodiment of the present invention.

In the proposed metrology system, an array of small lenses is distributed throughout the focus of a heliostat mirror, where each lens illuminated by the heliostat forms an image of the heliostat. To do this, at the tower receiver this fly's eye array is placed just below the receiver to measure any heliostat by tilting the heliostat to reflect sunlight to this lens array. A camera is then used to measure the array of pupil images and dissects the images to form a slope error map across the heliostat in a similar manner to a Pyramid wavefront sensor. This method of measurement is well explained visually (FIG. 29). FIG. 29 An array of pupil images formed where an ideally shaped heliostat is used in (a) and (b) and an astigmatically aberrated heliostat is used in (c). Sampling the pupil image array in (a) at the center of each pupil image recreates a low-resolution solar image. Similarly, in (b) sampling an off-axis pupil position forms a low-resolution solar image that is centered at the same location. For (c) the same off-axis pupil location forms a solar image that is offset due to astigmatism in the surface. Thus, the slope error across a heliostat mirror can be measured one pixel at a time.

If a heliostat were covered with a large mask so that only the central region was exposed, then that central region would act as a pinhole camera and form a dim solar image on the lenslet array. Each illuminated lenslet would then form a pupil image, which would be essentially a dot (i.e., the exposed region of the heliostat). This array of dots could be directly correlated to the solar image. Thus, a low-resolution solar image could be recreated for that pupil position.

Now consider a mask where only an off-axis section of the heliostat mirror is exposed. If the heliostat mirror was the correct shape, this off-axis section would form a solar image centered at the same location as the on-axis solar image. The slope error for this off-axis section would then be zero. Perhaps the shape of the mirror had some incorrect astigmatism. Then an off-axis section of the mirror would form a pupil image that was offset from the on-axis solar image. Thus, this off-axis section would have a slope error.

Figure 30:
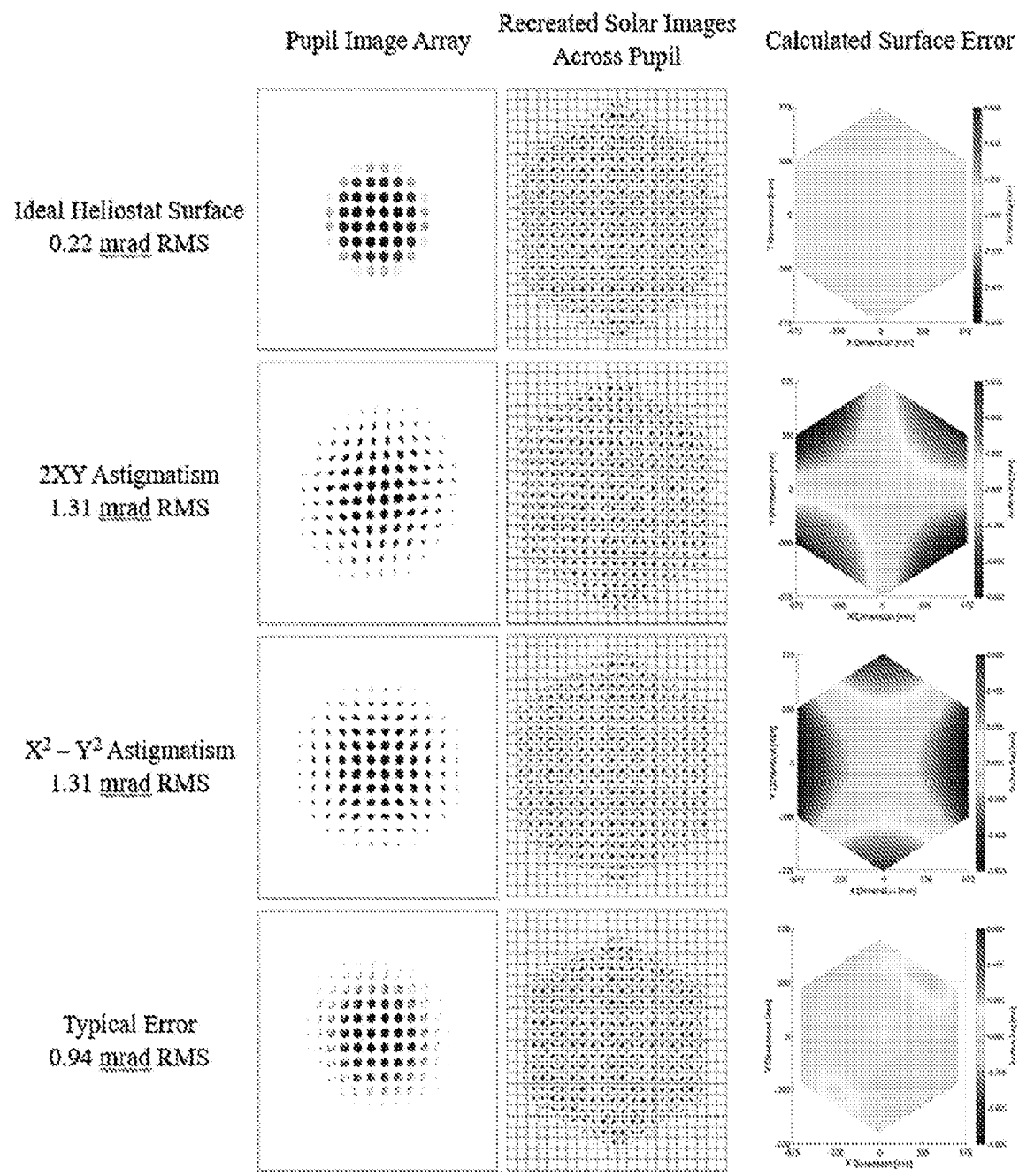
FIG. 30 shows simulated measurements using Solar wavefront metrology, according to an embodiment of the present invention.

Instead of sampling the heliostat slopes by blocking out everything but one small section at a time, obtaining an image of an array of pupil images provides the same information in one capture. By sampling an array of pupil images with the heliostat not covered, the location of the solar image formed by each pupil position can be measured. Using the centroid of each of these solar images, a slope error map can be formed relative to the on-axis pupil position, and these slopes can be integrated to form a surface map FIG. 30). FIG. 30 shows simulated measurements using Solar wavefront metrology, according to an embodiment of the present invention. The top row is for an ideally shaped heliostat, second row for a heliostat with oblique astigmatism, third row for a heliostat with vertical astigmatism, and the fourth row for one of the heliostat surfaces measured in the laser Hartmann measurement. The minimum measurement error is about 0.2 mrad RMS, enough for heliostat metrology. It was later found that there was defocus in the imaging lens, which is why the measurement accuracy was not better than 0.05 mrad RMS.

This second method is a null metrology measurement because it directly measures the shape error from ideal. In contrast, the laser Hartmann metrology system measures the absolute slope of the surface, therefore it is a non-null metrology measurement. Together these measurement methods play complementary rolls that determine the surface shape of a heliostat. The zoom Hartmann metrology system could measure the low frequency shape errors of heliostats at night with good fidelity, and the Solar wavefront metrology system could measure the mid frequency shape errors while a solar plant was in operation. Also, the Solar wavefront metrology system could be implemented using the Moon or the stars, though some modifications to the system shown above would be required. Starlight would require a larger number of lenses to obtain the necessary resolution, or a similar number of lenses with motion of the lens array.

Conclusion: Actively focusing heliostats have the potential to achieve high solar concentrations using in the hundreds or thousands of heliostats. This high concentration can be achieved throughout the day by actively changing the heliostat shape in three different modes: curvature, oblique astigmatism, and vertical astigmatism.

The metrology used for measuring the surface shape of such heliostats is beyond the modern state of the art in terms of in situ measurement fidelity and/or speed. Two metrology systems were herein presented, one of which was made and implemented for the measurement of a 1.58 $m^2$ hexagonal heliostat with active shape change capabilities. This first method involved the use of a laser array, which was imaged onto a distant heliostat. Laser beams were reflected from the heliostat to a retroreflective screen, and a scientific camera measured the laser spot location. After a series of calculations, a slope map and a surface shape were generated. The calculated surface errors were fixed by actuation of the heliostat.

A laser Hartmann metrology system performs non-null slope measurements and can be used in situ on an entire power tower plant so long as a zoom lens is used to image the laser array, and a camera is located close to each heliostat being measured. Additionally, the measurement screen needs to be sufficiently large to receive reflected spots from each heliostat mirror, perhaps twice as big as the heliostats in use.

A second metrology system was proposed that involves placing a wavefront sensor at the focus of a heliostat (i.e. in situ). This Solar wavefront sensor performs null slope measurements of a heliostat surface. A series of pupil images are formed by a lens array, the pupil images being dissected together to form a collection of solar images. The relative overlap of each solar image is determined, and a slope error map is directly calculated. Integration of the slopes provides the surface sag error.

Together these metrology systems play complementary roles that make it possible to obtain the fantastic shapes necessary to focus sunlight from on-axis to greater than 70° angle of incidence. A measurement using the laser Hartmann method takes <15 seconds to obtain surface shape errors, though the physical measurement takes ~1 second. A measurement using the Solar wavefront method takes a similar amount of time, though the physical measurement is only the exposure time of one image ($1/100^{th}$ of a second perhaps).

The true limitation for a focusing heliostat is how well the surface shape can be corrected by active bending. This shape correction need only be to ~1 mrad RMS slope error, which was obtained for the 1.58 $m^2$ hexagonal heliostat. Future developments may involve creating a larger heliostat, thus allowing for fewer heliostats in a power tower field. Additionally, this would reduce the time to measure all the heliostat mirror surfaces in a field, allowing for most of the time spent generating hydrogen fuel.

REFERENCES

1. H. M. Martin, "Making mirrors for giant telescopes," in (2019).
2. J. E. Greivenkamp, *Field Guide to Geometrical Optics* (2009).
3. M. W. Davidson and T. J. Fellers, "Understanding Conjugate Planes and Kohler Illumination," Aperture (2002).
4. M. Johns, "The Giant Magellan Telescope (GMT)," in *Ground-Based and Airborne Telescopes* (2006).
5. M. Johns, P. McCarthy, K. Raybould, A. Bouchez, A. Farahani, J. Filgueira, G. Jacoby, S. Shectman, and M. Sheehan, "Giant Magellan Telescope: overview," in *Ground-Based and Airborne Telescopes IV* (2012).
6. H. Baig, K. C. Heasman, and T. K. Mallick, "Non-uniform illumination in concentrating solar cells," Renew. Sustain. Energy Rev. (2012).
7. L. Huang, M. Idir, C. Zuo, and A. Asundi, "Review of phase measuring deflectometry," Opt. Lasers Eng. (2018).
8. I. Trumper, H. Choi, and D. W. Kim, "Instantaneous phase shifting deflectometry," Opt. Express (2016).
9. L. Jiang, X. Zhang, F. Fang, X. Liu, and L. Zhu, "Wavefront aberration metrology based on transmitted fringe deflectometry," Appl. Opt. (2017).
10. L. Huang, J. Xue, B. Gao, C. Zuo, and M. Idir, "Zonal wavefront reconstruction in quadrilateral geometry for phase measuring deflectometry," Appl. Opt. (2017).
11. P. Su, R. E. Parks, L. Wang, R. P. Angel, and J. H. Burge, "Software configurable optical test system: A computerized reverse Hartmann test," Appl. Opt. (2010).
12. A. Morales and D. Malacara, "Geometrical parameters in the Hartmann test of aspherical mirrors," Appl. Opt. (1983).
13. J. M. Sasian, *Introduction to Aberrations in Optical Imaging Systems*. (Cambridge University Press, 2012).
14. A. Rakich, "The 100th birthday of the conic constant and Schwarzschild's revolutionary papers in optics," in *Novel Optical Systems Design and Optimization VIII* (2005).
15. S. Yuan and J. Sasian, "Aberrations of anamorphic optical systems. I: The first-order foundation and method for deriving the anamorphic primary aberration coefficients," Appl. Opt. (2009).
16. P. J. Sands, "Thin double-plane symmetric field lenses," J. Opt. Soc. Am. (1973).
17. Y. Cao, L. Lu, and Z. Deng, "Chromatic aberration of plane-symmetric optical systems," Appl. Opt. (2019).
18. R. K. Tyson, "Conversion of Zernike aberration coefficients to Seidel and higher-order power-series aberration coefficients," Opt. Lett. (1982).
19. K. L. G. Parkin, "The Breakthrough Starshot system model," Acta Astronaut. (2018).
20. J. Hyatt, R. Eads, N. Didato, and R. Angel, "Laser beam projection for starshot launch," in *AO4ELT 2019—Proceedings 6th Adaptive Optics for Extremely Large Telescopes* (2019).
21. C. Ai and J. C. Wyant, "Effect of piezoelectric transducer nonlinearity on phase shift interferometry," Appl. Opt. (1987).
22. P. J. de Groot, "Vibration in phase-shifting interferometry: errata," J. Opt. Soc. Am. A (1995).
23. C. P. Brophy, "Effect of intensity error correlation on the computed phase of phase-shifting interferometry," J. Opt. Soc. Am. A (1990).
24. K. Masuko, M. Shigematsu, T. Hashiguchi, D. Fujishima, M. Kai, N. Yoshimura, T. Yamaguchi, Y. Ichihashi, T. Mishima, N. Matsubara, T. Yamanishi, T. Takahama, M. Taguchi, E. Maruyama, and S. Okamoto, "Achievement of more than 25% conversion efficiency with crystalline silicon heterojunction solar cell," IEEE J. Photovoltaics (2014).
25. J. F. Geisz, R. M. France, K. L. Schulte, M. A. Steiner, A. G. Norman, H. L. Guthrey, M. R. Young, T. Song, and T. Moriarty, "Six-junction III-V solar cells with 47.1% conversion efficiency under 143 Suns concentration," Nat. Energy (2020).
26. C. Meehan, "NREL Developing Improved Tech to Lower Costs for Multi-Junction Solar Cells," (2018).
27. M. Saadah, E. Hernandez, and A. A. Balandin, "Thermal management of concentrated multi junction solar cells with graphene-enhanced thermal interface materials," Appl. Sci. (2017).
28. J. Hyatt, C. Davila, N. Didato, R. Peon, M. Rademacher, D. Reshidko, F. Sodari, P. Strittmatter, G. Vincent, B. Wheelwright, C. Zammit, and R. Angel, "CPV generator with dish reflector and fly's eye receiver," in *AIP Conference Proceedings* (2018).
29. R. W. Eads, J. Hyatt, and R. Angel, "Optical design for a Fly's eye CPV system with large, on axis dish solar concentrator," in *AIP Conference Proceedings* (2019), Vol. 2149.
30. W. Marion and S. Wilcox, "A new solar radiation data manual for flat-plate and concentrating collectors," in (2008).
31. B. Gross, "Replacing Fuels with Sunlight," (2020).
32. D. Barley, R. Vidu, and P. Stroeve, "Innovation in concentrated solar power," Sol. Energy Mater. Sol. Cells (2011).
33. AFDC, "Hydrogen Basics," (n.d.).
34. D. Roberts, "This climate problem is bigger than cars and much harder to solve," (2019).
35. M. Solar, "Megalim Solar Power—The Project," (2019).
36. E. A. Igel and R. L. Hughes, "Optical analysis of solar facility heliostats," Sol. Energy (1979).
37. M. Lando, J. Kagan, B. Linyekin, L. Sverdalov, G. Pecheny, and Y. Achiam, "Astigmatic corrected target-aligned solar concentrator," Opt. Commun. (2000).
38. R. Zaibel, E. Dagan, J. Karni, and H. Ries, "An astigmatic corrected target-aligned heliostat for high concentration," Sol. Energy Mater. Sol. Cells (1995).
39. A. Kraemer, "At the solarpaces Conference, Heliogen INTRODUCES solar heat at 1 cent/kWh," (2020).
40. W. Xu, Z. Lu, H. Liu, H. Zhang, and Z. Ni, "Shape and alignment measurement of the heliostat by laser deflectometry," in *Optical Modeling and Measurements for Solar Energy Systems II* (2008).
41. M. Roger, C. Prahl, and S. Ulmer, "Fast Determination of Heliostat Shape and Orientation By Edge Detection and Photogrammetry," in *Proceedings of the 14th Biennial CSP SolarPACES Symposium* (2008).
42. R. Kingslake, "The "absolute" Hartmann test," Trans. Opt. Soc. (1928).
43. R. Huang, P. Su, J. H. Burge, L. Huang, and M. Idir, "High-accuracy aspheric x-ray mirror metrology using Software Configurable Optical Test System/deflectometry," Opt. Eng. (2015).

44. R. Eads and R. Angel, "6.5 m telescope for multi-object spectroscopy over a 3° field of view," Appl. Opt. 59, (2020).
45. N. MKS, "Piezo Actuator, Tiny Picomotor, 12.7 mm Travel, 0.25 in. Shank," (2020).
46. R. V. Shack and G. W. Hopkins, "SHACK INTERFEROMETER.," in *Clever Opt, Innovative Appl of Opt* (1977).
47. O. Pirnay, V. Moreau, and G. Lousberg, "OAJ: 2.6m wide field survey telescope," in *Ground-Based and Airborne Telescopes IV* (2012).
48. W. Saunders, P. Gillingham, G. Smith, S. Kent, and P. Doel, "Prime focus wide-field corrector designs with lossless atmospheric dispersion correction," in *Advances in Optical and Mechanical Technologies for Telescopes and Instrumentation* (2014).
49. R. Tamai and J. Spyromilio, "European Extremely Large Telescope: progress report," in *Ground-Based and Airborne Telescopes V* (2014).
50. J. C. Christou, "Image quality, tip-tilt correction, and shift-and-add infrared imaging," Publ. Astron. Soc. Pacific (1991).
51. L. Yuan, J. Xie, Z. He, Y. Wang, and J. Wang, "Optical design and evaluation of airborne prism-grating imaging spectrometer," Opt. Express (2019).
52. J. Sasián, *Introduction to Lens Design* (2019).
53. R. W. Eads and J. R. P. Angel, "A 20 m wide-field diffraction-limited telescope," Philos. Trans. R. Soc. A Math. Phys. Eng. Sci. 379, 20200141 (2020).
54. G. Mosby, B. J. Rauscher, C. Bennett, E. S. Cheng, S. Cheung, A. Cillis, D. Content, D. Cottingham, R. Foltz, J. Gygax, R. J. Hill, J. W. Kruk, J. Mah, L. Meier, C. Merchant, L. Miko, E. C. Piquette, A. Waczynski, and Y. Wen, "Properties and characteristics of the Nancy Grace Roman Space Telescope H4RG-10 detectors," J. Astron. Telesc. Instruments, Syst. (2020).
55. S. Aloezos, J. Crooke, C. D. Dressing, L. Fantano, J. E. Hylan, S. Tompkins, M. R. Bolcar, V. T. Bly, C. Collins, L. D. Feinberg, K. France, G. Gochar, Q. Gong, A. Jones, I. Linares, M. Postman, L. Pueyo, A. Roberge, L. Sacks, and G. West, "The Large UV/Optical/Infrared (LUVOIR) Surveyor: Decadal Mission concept design update," in (2017).
56. D. G. Korsch, "<title>Optical design considerations for next-generation space and lunar telescopes</title>," in *Space Astronomical Telescopes and Instruments*, P. Y. Bely and J. B. Breckinridge, eds. (SPIE, 1991).
57. J. B. Hadaway, M. E. Wilson, D. C. Redding, and R. A. Woodruff, "Lessons learned in the optical design of the Next-Generation Space Telescope," in *Space Telescopes and Instruments V* (1998).
58. J. M. Sasian, "Flat-Field, Anastigmatic, Four-Mirror Optical System For Large Telescopes," Opt. Eng. (1987).
59. C. Zhao and J. H. Burge, "Comparison of exact pupil astigmatism conditions with Seidel approximations," Appl. Opt. (2002).
60. "Astronomical algorithms," Choice Rev. Online (1992).
61. NOAA, "ESRL Global Monitoring Laboratory—Global Radiation and Aerosols," https://www.esrl.noaa.gov/gmd/grad/solcalc/calcdetails.html.
62. D. J. O'Boy and V. V. Krylov, "Vibration of a rectangular plate with a central power-law profiled groove by the Rayleigh-Ritz method," Appl. Acoust. (2016).
63. I. Senjanović, N. Hadžić, N. Vladimir, and D. S. Cho, "Natural vibrations of thick circular plate based on the modified Mindlin theory," Arch. Mech. (2014).

While various embodiments of the present invention are described below, after the claims, it should be understood that they are presented by way of example only, and not limitation. Thus, the breadth and scope of the present invention should not be limited by any of the described illustrative embodiments but should instead be defined only in accordance with the following claims and their equivalents.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the teachings herein. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A system for providing a contour map of the surface of a heliostat from reflected sunlight using a fly's eye camera comprising:
   an entrance screen configured to receive sunlight reflected by the heliostat;
   an array of imaging apertures extending across the entrance screen, each aperture forming an image of said heliostat from a different viewpoint to provide a plurality of heliostat images;
   one or more digital cameras configured to view all of said plurality of heliostat images;
   an image processor configured to map out from said plurality of heliostat images a location of sunlight delivered to said entrance screen by each of a plurality of different resolved subsections of the heliostat reflecting surface to obtain a plurality of maps, and to provide, based on centroids of said maps a tip and tilt of each said subsection,
   wherein a reflecting surface profile of the heliostat is obtained by integration of said subsection tilts across all the subsections.

2. The system according to claim 1, wherein the heliostat has approximately a torroidal shape used to form a disc image of the sun at the location of said entrance screen, with low order distortion of focus and astigmatism, so that said individual reflector subsections form disc images, wherein said reflecting surface profile obtained by integration maps indicates the magnitude and sign of the focus and astigmatism distortions.

3. The system according to claim 2, wherein said individual reflector subsections form disc images, said disc images not all overlapping.

4. The system according to claim 1 wherein said imaging apertures form multiple images of said heliostat reflector on a single imaging screen behind, and all said heliostat images are viewed by a single digital camera.

5. The system according to claim 1, further comprising a plurality of zoom lenses, each zoom lens being disposed at each entrance aperture.

6. The system according to claim 1, further comprising a plurality of heliostats configured to be aimed down one at a time to focus a solar disc to said fly's eye camera, said fly eye camera is configured to rotate about a central receiver tower, and tilts up and down to view all heliostats all around, from the nearest to the farthest.

7. The system according to claim 1, wherein the image processor is configured to deliver the heliostat's tip/tilt error as well as its shape error.

8. A method to measure the shape of the surface of a heliostat, comprising:
providing a plurality of lasers configured in an array of lasers with a same geometry as a much larger reflective surface of a heliostat;
orienting laser beams of said plurality of lasers to pass through a zoom lens set to yield an image of the array of lasers magnified to match a size of said heliostat;
reflecting said laser beams by the heliostat to a separated distant receiving screen;
recording a position of the laser beams on a reflector surface of said heliostat and on said receiving screen using one or a plurality of digital cameras; and
calculating a shape of said reflector surface of said heliostat based on known positions of said plurality of lasers and of the position of said plurality of laser beams incident on said reflector surface of said heliostat and on said receiving screen.

9. The method according to claim 8, further comprising orienting the heliostat to reflect and focus starlight onto the array of a two-dimensional array of digital cameras located at or near a receiver and viewing the heliostat under measurement.

10. The method according to claim 8, further comprising computing a slope of the reflector surface using Snell's law for any point on the reflector surface that appears bright in the view from a given camera based on known locations of a star, a reflecting surface point and the camera.

11. The method according to claim 8, performing a complete measurement in a single period of time exposure without moving the heliostat.

12. The method according to claim 11, wherein the period of time is ~10-second.

13. The method according to claim 8, further comprising covering all viewing points during an exposure of the camera array translated in a spiral pattern.

14. The method according to claim 8, wherein a mechanical linkage ensures that the array is not rotated about the line of sight but is tilted slightly so it is aimed always at the heliostat center.

15. The method according to claim 8, wherein during an exposure corresponding images remain sharp throughout the exposure.

16. The method according to claim 8, wherein moving a translational spiral so that a time-averaged response function of each camera is conical, with an exposure time to any incoming ray dropping linearly to zero at a lens spacing distance.

* * * * *